(12) United States Patent
Dou et al.

(10) Patent No.: US 11,832,340 B2
(45) Date of Patent: Nov. 28, 2023

(54) SESSION MANAGEMENT METHOD AND APPARATUS

(71) Applicant: HUAWEI TECHNOLOGIES CO., LTD., Guangdong (CN)

(72) Inventors: Fenghui Dou, Beijing (CN); Kai Yuan, Shenzhen (CN); Chaofeng Lian, Shenzhen (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/631,045

(22) PCT Filed: Jul. 29, 2020

(86) PCT No.: PCT/CN2020/105538
§ 371 (c)(1),
(2) Date: Jan. 28, 2022

(87) PCT Pub. No.: WO2021/018200
PCT Pub. Date: Feb. 4, 2021

(65) Prior Publication Data
US 2022/0322488 A1     Oct. 6, 2022

(30) Foreign Application Priority Data
Jul. 29, 2019 (CN) .......................... 201910688981.6

(51) Int. Cl.
*H04W 76/34* (2018.01)
*H04W 28/02* (2009.01)
*H04W 72/54* (2023.01)

(52) U.S. Cl.
CPC ....... *H04W 76/34* (2018.02); *H04W 28/0268* (2013.01); *H04W 72/54* (2023.01)

(58) Field of Classification Search
CPC ..... H04L 67/14; H04L 67/141; H04L 67/143; H04W 28/0268; H04W 76/34;
(Continued)

(56) References Cited

U.S. PATENT DOCUMENTS

| | | | |
|---|---|---|---|
| 2019/0020509 A1* | 1/2019 | Healey | H04L 69/324 |
| 2019/0059067 A1* | 2/2019 | Lee | H04W 28/10 |

(Continued)

FOREIGN PATENT DOCUMENTS

| | | |
|---|---|---|
| CN | 108370600 A | 8/2018 |
| CN | 108781381 A | 11/2018 |

(Continued)

OTHER PUBLICATIONS

"3rd Generation Partnership Project; 1-13 Technical Specification Group Radio Access Network; NR; NR and NG-RAN Overall Description; Stage 2 (Release 15). ", 3GPP Draft; 38300-F60, 3rd Generation Partnership Project (3GPP), Mobile Competence Centre; 650, Route Des Lucioles; F-06921 Sophia-Antipolis Cedex; France Jun. 28, 2019 (Jun. 28, 2019), XP051744786, 100 pages.

(Continued)

*Primary Examiner* — Nathan S Taylor

(57) ABSTRACT

The technology of this application relates to a method including, when a user equipment (UE) determines that a preset condition is met, the UE sends a session release request message or a session modification request message to a network device. The session release request message is used to request to release a first PDU session, the session modification request message is used to request to release a first quality of service (QoS) flow, and the first PDU session is one of existing PDU sessions in the UE. The preset condition includes at least one of: a quantity of existing PDU sessions in the UE reaching a first threshold; a quantity of data radio bearers (DRB)s associated with the existing PDU (Continued)

session in the UE reaching a second threshold; and a quantity of quality of service flows associated with the existing PDU session in the UE reaching a third threshold.

17 Claims, 11 Drawing Sheets

(58) Field of Classification Search
CPC . H04W 28/0252; H04W 76/25; H04W 76/30; H04W 72/54; H04W 28/02; H04W 76/00
See application file for complete search history.

(56) References Cited

U.S. PATENT DOCUMENTS

| | | | |
|---|---|---|---|
| 2019/0159059 A1* | 5/2019 | Jheng | H04L 47/805 |
| 2019/0313478 A1* | 10/2019 | Huang-Fu | H04W 36/14 |
| 2020/0170055 A1* | 5/2020 | Dou | H04W 64/003 |
| 2020/0245405 A1* | 7/2020 | Tang | H04W 40/02 |
| 2021/0160936 A1* | 5/2021 | Yang | H04W 76/10 |
| 2021/0168643 A1* | 6/2021 | Yao | H04L 41/5019 |
| 2022/0104296 A1* | 3/2022 | Mary | H04W 76/15 |
| 2022/0159605 A1* | 5/2022 | Li | H04W 60/00 |
| 2022/0240213 A1* | 7/2022 | Ly | H04W 60/04 |

FOREIGN PATENT DOCUMENTS

| | | |
|---|---|---|
| CN | 109246173 A | 1/2019 |
| CN | 110012553 A | 7/2019 |
| CN | 110474969 A | 11/2019 |
| WO | 2018205153 A1 | 11/2018 |
| WO | 2019114939 A1 | 6/2019 |

OTHER PUBLICATIONS

Interdigital Inc: "SSC3 failure", 3GPP Draft; CI-174091-SSC3-FAILURE, 3RD Generation Partnership Project (3GPP), Mobile Competence Centre; 650, Route Des Lucioles; F-06921 Sophia-Antipolis. Cedex; France vol. CTWGI, No. Kochi (India); Oct. 23, 2017-2017102722 Oct. 2017 (Oct. 22, 2017), XP051337927, 4 pages.
Extended European Search Report issued in EP20845988.3, dated Jul. 8, 2022, 10 pages.
LG Electronics et al.,"TS 23.502: Clarification on PDU Session related procedures for N3GPP", Dec. 2017, total: 259 pages.
3GPP TS 24.501 V16.1.0 (Jun. 2019) total 541 pages.
ZTE et al.,"Update PDU Session at P-CSCF Failure", 3GPP TSG CT4 Meeting #84, KunMing, P.R. China; Apr. 16-20, 2018, C4-183111 total 5 pages.
PCT International Search Report for PCT/CN2020/105538 dated Jul. 29, 2020, 11 pages.
Chinese Office Action for Application No. 201910688981.6 dated May 9, 2020, 7 pages.
Chinese Office Action for Application No. 201910688981.6 dated May 6, 2021, 4 pages.

* cited by examiner

SESSION MANAGEMENT METHOD AND APPARATUS

CROSS REFERENCE TO RELATED APPLICATIONS

This application is a national stage of International Application No. PCT/CN2020/105538, filed on Jul. 29, 2020, which claims priority to Chinese Patent Application No. 201910688981.6, filed on Jul. 29, 2019. Both of the aforementioned applications are hereby incorporated by reference in their entireties.

TECHNICAL FIELD

This application relates to the field of communications technologies, and in particular, to a session management method and apparatus.

BACKGROUND

A session is a connection between user equipment (UE) and a data network (DN), and is used to transmit data between the UE and the data network.

In a fifth generation mobile communications technology (5G), sessions are collectively referred to as protocol data unit (PDU) sessions. Based on different session requirements of applications, one UE may establish a plurality of PDU sessions to transmit data of different applications. Further, for one PDU session, one UE may establish one or more QoS flows based on different quality of service (QoS) requirements of carried data. Different QoS flows represent different QoS data distribution and processing, and can carry data with different QoS requirements. The QoS flow represents a concept of a bearer between the UE and a user plane function (UPF) entity, and specifically includes two parts: a data radio bearer (DRB) and a next generation-user plane tunnel (NG-U Tunnel). The DRB is used to carry data of a QoS flow over an air interface (that is, between the UE and a base station), and the next-generation user plane tunnel is used to carry the data of the QoS flow over an N3 interface (that is, between the base station and the UPF). In addition, a correspondence exists between a DRB and a QoS flow. That is, one or more QoS flows may be transmitted through one DRB. Generally, data of one QoS flow is carried on only one DRB. Therefore, for one PDU session, the UE may also establish a plurality of DRBs.

According to a UE capability, a network capability, and a communications protocol, there is an upper limit on a quantity of PDU sessions, a quantity of QoS flows, or a quantity of DRBs that can be established by the UE. When a quantity of existing PDU sessions in the UE reaches the upper limit, or when the quantity of existing PDU sessions in the UE does not reach the upper limit, but the quantity of DRBs or QoS flows associated with the existing PDU sessions in the UE reaches the upper limit, the UE cannot initiate a session establishment request message to a network device, or the network device rejects the session establishment request message initiated by the UE. In this case, a new PDU session cannot be established. As a result, a PDU session establishment success rate is low, and a service data transmission delay is long.

SUMMARY

Embodiments of this application provide a session management method and apparatus, to improve a PDU session establishment success rate and reduce a service data transmission delay.

To achieve the foregoing objective, the following technical solutions are used in the embodiments of this application.

According to a first aspect, the embodiments of this application provide a session management method, and the method may be performed by user equipment UE. The user equipment may be a terminal device, or may be a component (for example, a chip system) in the terminal device, and a protocol data unit (PDU) session exists in the UE. The method includes: when the UE determines that a preset condition is met, the UE sends a session release request message or a session modification request message to a network device. The session release request message is used to request to release a first PDU session, the session modification request message is used to request to release a first quality of service QoS flow, and the first PDU session is one of the existing PDU sessions in the UE. The preset condition includes at least one of the following: a quantity of existing PDU sessions in the UE reaches a first threshold; a quantity of data radio bearers (DRB)s associated with the existing PDU session in the UE reaches a second threshold; and a quantity of quality of service (QoS) flows associated with the existing PDU session in the UE reaches a third threshold.

In this way, the UE can determine whether the preset condition is met. When the UE meets the preset condition, the UE sends the session release request message to the network device, to request to release the first PDU session in the existing PDU sessions in the UE, or the UE sends the session modification request message to the network device, to request to release a first QoS flow in the existing PDU session in the UE, so that a DRB between the UE and a RAN can be released. This saves communications resources. Even if the UE needs to establish a new second PDU session, a phenomenon that a session establishment request message is rejected by the network device does not exist, so that the new PDU session is successfully established. This improves a PDU session establishment success rate, and reduces a service data transmission delay.

In a possible implementation, the preset condition further includes: The second PDU session needs to be established.

In a possible implementation, the UE includes a first module and a second module, the first module belongs to an access stratum, and the second module belongs to a non-access stratum. The quantity of DRBs is obtained by the second module from the first module.

In this way, the non-access stratum module can obtain the quantity of DRBs associated with the existing PDU session. That is, an interaction mechanism between the access stratum and the non-access stratum is added, so that the non-access stratum can determine whether the quantity of DRBs associated with the existing PDU session reaches the second threshold.

In a possible implementation, the first PDU session meets at least one of the following: the first PDU session is a local area data network LADN session, and the UE is located outside a service area of the LADN session; a user plane connection of the first PDU session is in an unestablished state; duration in which the user plane connection of the first PDU session is in the unestablished state is greater than duration in which a user plane connection of a third PDU session is in the unestablished state; a quantity of QoS rules associated with the first PDU session is less than a quantity of QoS rules associated with the third PDU session; a quantity of applications associated with the first PDU session is less than a quantity of applications associated with the third PDU session; and the first PDU session is not associated with a specified application. The third PDU session is any PDU session that is in the existing PDU sessions in the UE and that is different from the first PDU session.

In this way, the session management method in the embodiments of this application can determine the first PDU session from the existing PDU sessions in the UE, and release the first PDU session that has minimal impact on a service, so that the quantity of the existing PDU sessions in the UE no longer reaches the first threshold. Because the first PDU session is a PDU session that meets at least one of the foregoing items, the first PDU session has minor impact on the service of the UE.

In a possible implementation, the first QoS flow meets at least one of the following: a DRB to which the first QoS flow is mapped has a correspondence with only the first QoS flow; a quantity of QoS rules associated with the first QoS flow is less than a quantity of QoS rules associated with a second QoS flow; a quantity of applications associated with the first QoS flow is less than a quantity of applications associated with the second QoS flow; and the first QoS flow is not associated with a specified application. The second QoS flow is any QoS flow that is in the existing PDU session in the UE and that is different from the first QoS flow.

In this way, the session management method in the embodiments of this application can determine the first QoS flow from the plurality of QoS flows associated with the existing PDU session in the UE, to release the first QoS flow that has minimal impact on a service, and implement session modification, so that the quantity of DRBs associated with the existing PDU session in the UE no longer reaches the second threshold, or the quantity of QoS flows associated with the existing PDU session in the UE no longer reaches the third threshold. Because the first QoS flow is a QoS flow that meets at least one of the foregoing items, the first QoS flow has minor impact on the service of the UE.

In a possible implementation, the DRB to which the first QoS flow is mapped is determined by the second module based on the correspondence between the DRB and the QoS flow. The correspondence between the DRB and the QoS flow is obtained by the second module from the first module.

In a possible implementation, after the UE sends the session release request message or the session modification request message to the network device, the session management method in the embodiments of this application further includes: the UE sends a session establishment request message to the network device, where the session establishment request message is used to request to establish the second PDU session.

In a possible implementation, the UE includes an application processor (AP) and a modem. The modem includes the first module and the second module. The first module belongs to the access stratum, and the second module belongs to the non-access stratum. That the UE determines that a preset condition is met includes: the AP determines that a quantity of existing network connections in the UE reaches the first threshold; or the second module determines that the quantity of existing PDU sessions in the UE reaches the first threshold; or the second module determines that the quantity of DRBs associated with the existing PDU session in the UE reaches the second threshold; or the second module determines that the quantity of QoS flows associated with the existing PDU session in the UE reaches the third threshold. Each network connection corresponds to one PDU session. On a modem side, "a connection for transmitting data between UE and a data network" is usually described as a PDU session, and on an application processor side, "a connection for transmitting data between UE and a data network" is usually described as a network connection.

According to a second aspect, the embodiments of this application provide a session management apparatus, where a protocol data unit (PDU) session exists in the session management apparatus. The apparatus includes a processing unit and a communications unit. The processing unit is configured to determine that the session management apparatus meets a preset condition; and the communications unit is configured to send a session release request message or a session modification request message to a network device. The session release request message is used to request to release a first PDU session, the session modification request message is used to request to release a first quality of service (QoS) flow, and the first PDU session is one of the existing PDU sessions in the session management apparatus. The preset condition includes at least one of the following: a quantity of existing PDU sessions in the session management apparatus reaches a first threshold; a quantity of data radio bearers (DRB)s associated with the existing PDU session in the session management apparatus reaches a second threshold; and a quantity of quality of service (QoS) flows associated with the existing PDU session in the session management apparatus reaches a third threshold.

In a possible implementation, the preset condition further includes: a second PDU session needs to be established.

In a possible implementation, the processing unit includes a first module and a second module, the first module belongs to an access stratum, and the second module belongs to a non-access stratum. The quantity of DRBs is obtained by the second module from the first module.

In a possible implementation, the first PDU session meets at least one of the following: the first PDU session is a local area data network (LADN) session, and the session management apparatus is located outside a service area of the LADN session; a user plane connection of the first PDU session is in an unestablished state; duration in which the user plane connection of the first PDU session is in the unestablished state is greater than duration in which a user plane connection of a third PDU session is in the unestablished state; a quantity of QoS rules associated with the first PDU session is less than a quantity of QoS rules associated with the third PDU session; a quantity of applications associated with the first PDU session is less than a quantity of applications associated with the third PDU session; and the first PDU session is not associated with a specified application. The third PDU session is any PDU session that is in the existing PDU sessions in the session management apparatus and that is different from the first PDU session.

In a possible implementation, the first QoS flow meets at least one of the following: a DRB to which the first QoS flow is mapped has a correspondence with only the first QoS flow, that is, the DRB is used only to carry data of the first QoS flow over an air interface, and does not carry data of another QoS flow, and one DRB is accordingly released after the first QoS is released; a quantity of QoS rules associated with the first QoS flow is less than a quantity of QoS rules associated with a second QoS flow; a quantity of applications associated with the first QoS flow is less than a quantity of applications associated with the second QoS flow; and the first QoS flow is not associated with a specified application. The second QoS flow is any QoS flow that is in the existing PDU session in the session management apparatus and that is different from the first QoS flow.

In a possible implementation, the DRB to which the first QoS flow is mapped is determined by the second module based on the correspondence between the DRB and the QoS flow. The correspondence between the DRB and the QoS flow is obtained by the second module from the first module.

In a possible implementation, the communications unit is further configured to send a session establishment request message to the network device after sending the session release request message or the session modification request message to the network device, where the session establishment request message is used to request to establish the second PDU session.

In a possible implementation, the processing unit includes a first processing unit and a second processing unit, and the second processing unit includes the first module and the second module. The first module belongs to the access stratum, and the second module belongs to the non-access stratum. The first processing unit is configured to determine that a quantity of existing network connections in the session management apparatus reaches the first threshold, or the second module is configured to determine that the quantity of existing PDU sessions in the session management apparatus reaches the first threshold, or the second module is configured to determine that the quantity of DRBs associated with the existing PDU session in the session management apparatus reaches the second threshold, or the second module is configured to determine that the quantity of QoS flows associated with the existing PDU session in the session management apparatus reaches the third threshold. Each network connection corresponds to one PDU session.

According to a third aspect, the embodiments of this application provide a session management apparatus. The apparatus has a function of implementing the session management method according to any item of the first aspect. The function may be implemented by using hardware, or may be implemented by hardware executing corresponding software. The hardware or the software includes one or more modules corresponding to the function.

According to a fourth aspect, the embodiments of this application provide a session management apparatus, including a processor and a memory, where the memory is configured to store computer executable instructions. When the session management apparatus runs, the processor executes the computer executable instructions stored in the memory, so that the session management apparatus performs the session management method according to any item of the first aspect.

According to a fifth aspect, the embodiments of this application provide a session management apparatus, including a processor, where the processor is configured to be coupled to a memory, and after reading instructions in the memory, perform, based on the instructions, the session management method according to any item of the first aspect.

According to a sixth aspect, the embodiments of this application provide a computer-readable storage medium. The computer-readable storage medium stores instructions, and when the instructions are run on a computer, the computer is enabled to perform the session management method according to any item of the first aspect.

According to a seventh aspect, the embodiments of this application provide a computer program product including instructions. When the computer program product runs on a computer, the computer is enabled to perform the session management method according to any item of the first aspect.

According to an eighth aspect, the embodiments of this application provide a circuit system, where the circuit system includes a processing circuit, and the processing circuit is configured to perform the session management method according to any item of the first aspect.

According to a ninth aspect, the embodiments of this application provide a chip, where the chip includes a processor, the processor is coupled to a memory, the memory stores program instructions, and when the program instructions stored in the memory are executed by the processor, the session management method in any item of the first aspect is implemented.

According to a tenth aspect, the embodiments of this application provide a communications system, where the communications system includes the user equipment and the network device in the foregoing aspects.

For technical effects brought by any implementation manner of the second to the tenth aspects, refer to technical effects brought by different implementation manners of the first aspect.

DESCRIPTION OF EMBODIMENTS

Figure 1:
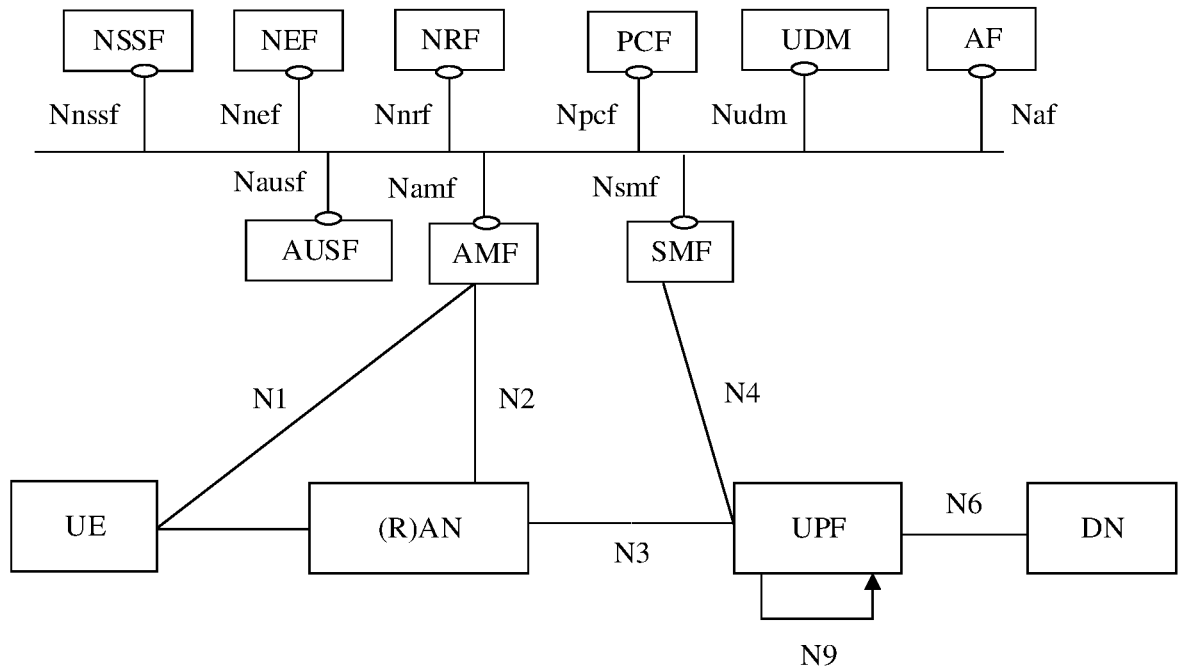
FIG. 1 is an example schematic diagram of a hardware architecture of user equipment according to an embodiment of this application.

In the specification and accompanying drawings of this application, the terms "first," "second," and the like are intended to distinguish between different objects or distinguish between different processing of a same object, but do not describe a particular order of the objects. In addition, the terms "include," "have," and any other variant thereof mentioned in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that in embodiments of this application, a word such as "example" or "for example" is used to represent an example, an example illustration, or description. Any embodiment or implementation scheme described as "example" or "for example" in the embodiments of this application should not be explained as being more preferred or having more advantages than another embodiment or implementation scheme. Specifically, use of "example" or "for example" is intended to present a related concept in a specific manner.

In a fifth generation (5G) mobile communications technology, a PDU session used to provide a protocol data unit (PDU) connectivity service exists between user equipment (UE) and a data network (DN). However, quality of service (QoS) is managed based on a flow. One PDU session may include one or more QoS flows.

Each QoS flow includes one or more QoS rules. A core network provides the UE with a QoS rule corresponding to each QoS flow. The QoS rule provides an association relationship between uplink data and a QoS flow, so that the UE maps the uplink data to the corresponding QoS flow. The QoS rules reflect, to some extent, a quantity of data flows or a quantity of applications mapped to the QoS flows. The data flow is a set of sequential byte sets that have a start point and an end point.

Different QoS flows have different QoS parameters. The QoS parameter includes but is not limited to a 5G QoS identifier (5QI), an allocation and retention priority (ARP), a guaranteed flow bit rate (GFBR), a maximum flow bit rate (MFBR), notification control, reflective QoS attribute (RQA), a maximum packet loss rate of an uplink and a downlink (maximum packet loss rate-up link and down link), and the like. The core network provides a QoS parameter corresponding to each QoS flow to an access network, and the access network completes configuration of a data radio bearer (DRB) and mapping between the QoS flow and the DRB based on the QoS parameter. For example, a plurality of QoS flows having a same QoS parameter or having similar QoS parameters are mapped to a same DRB. The mapped one or more QoS flows are transmitted through the DRB.

In a fourth generation (4G) mobile communications technology, UE usually establishes only two sessions. One session is used to transmit a voice service, and the other session is used to transmit a data service. The UE does not have a scenario in which "a quantity of existing sessions in the UE reaches an upper limit," nor does a mechanism in which "a session is released when the quantity of sessions reaches the upper limit." Compared with the 4G mobile communications technology, in the 5G mobile communications technology, the UE can establish more PDU sessions, and the PDU sessions have more attributes, for example, PDU sessions that serve different network slices, and PDU sessions that can implement different service and session continuity (SSC) modes. However, a quantity of PDU sessions that can be established by the UE is limited. A maximum quantity of PDU sessions that can be established by the UE is usually determined based on a minimum value in a maximum quantity of PDU sessions that can be implemented by the UE, a maximum quantity of PDU sessions supported by a network device, and a maximum quantity of PDU sessions allowed by a communications protocol. When the quantity of existing PDU sessions in the UE reaches a first threshold, if the UE needs to establish a new PDU session, a session establishment request message initiated by the UE to the network device is rejected. In this case, the UE needs to first perform a session release procedure, and then establish anew PDU session. This reduces a PDU session establishment success rate, and increases a service data transmission delay.

In addition, compared with the 4G mobile communications technology, in the 5G mobile communications technology, a QoS control granularity of the UE is finer, and the UE can establish more QoS flows and DRBs. A relationship between QoS flows and DRBs is not limited to one-to-one mapping. For example, one DRB may carry one QoS flow (that is, a ratio of a quantity of DRBs to a quantity of QoS flows is 1:1), and may carry a plurality of QoS flows (that is, a ratio of the quantity of DRBs to the quantity of QoS flows is 1:N). One PDU session can be associated with a plurality of DRBs. Therefore, when the quantity of existing PDU sessions in the UE does not reach the first threshold, but the quantity of DRBs associated with the existing PDU session in the UE reaches a second threshold, or the quantity of QoS flows associated with the existing PDU session in the UE reaches a third threshold, if the UE needs to establish a new PDU session, a session establishment request message initiated by the UE to the network device is still rejected, and a new PDU session cannot be established. This also reduces the PDU session establishment success rate.

In view of this, the embodiments of this application provide a session management method. A communications system to which the session management method in the embodiments of this application is applicable is first described. The communications system may be a communications system supporting a 5G mobile communications technology, for example, a new radio (NR) access technology. Alternatively, the communications system may be a communications system supporting a plurality of wireless technologies, for example, a communications system supporting an LTE technology and an NR access technology. In addition, the communications system is also applicable to a future-oriented communications technology.

Refer to FIG. 1. A network architecture of the communications system is described by using the communications system supporting the 5G mobile communications technology as an example. Network elements in the 5G network architecture include an access network (AN), an access and mobility management function (authentication management function, AMF) entity, a session management function (SMF) entity, a policy control function (PCF) entity, a user plane function (UPF) entity, a unified data management (UDM) entity, an authentication server function (AUSF) entity, a data network (DN), an application function (AF) entity, a network repository function (NRF) entity, a network exposure function (NEF) entity, a network slice selection function (NSSF) entity, and the like.

The access network may be a radio access network (RAN), and a radio access network device is an apparatus deployed in the radio access network to provide a wireless communications function. Optionally, the RAN device in the embodiments of this application includes, for example, but is not limited to, a macro base station, a micro base station (also referred to as a small cell), a relay station, a transmission reception point (TRP), a next generation network node (g NodeB, gNB), and an evolved NodeB (ng evolved NodeB, ng-eNB) connected to a next-generation core network, and the like, and may further include a RAN device of a non-3rd generation partnership project (3GPP) system such as a wireless local area network (WLAN) access device.

The AMF entity has functions such as mobility management, registration management, connection management, lawful interception, supporting transmission of session management (SM) information between the UE and the SMF, access authentication, and access authorization of the UE.

The SMF entity has functions such as session management and roaming. The session management function includes, for example, session establishment, modification, and release. The roaming function may include charging data collection, and signaling transmission supporting authentication/authorization with an external data network (DN).

The PCF entity includes a user subscription information management function, a policy control function, a charging policy control function, quality of service (QoS) control, and the like.

The UPF entity is a functional network element on a user plane, and is mainly responsible for connecting to an external network and processing a user packet, such as forwarding, charging, and lawful interception. Optionally, the UPF entity may further receive data.

The UDM entity has functions such as certificate processing, user identification processing, access authorization, registration and mobility management, subscription management, and short message management.

The AUSF entity has an authentication service function.

The DN is a network that provides a service for UE. For example, some DNs provide an Internet access function for the UE, and other DNs provide a short message function for the UE.

The AF entity may interact with a 3GPP core network. The AF entity may be specifically an application server, and may be configured to interact with the PCF entity to customize a policy for an application.

The NRF entity is a logical entity configured to store and maintain information about a network function (NF) instance. When receiving a service request of a user, the NF instance may obtain, by querying the NRF entity, another NF instance that can provide a network service requested by the user, to determine a next-hop route.

The NEF entity can provide network functions such as a service, a capability, an application function, and edge computing of the network element. Optionally, the NEF entity further provides an application function for providing information to the 3GPP core network, for example, a mobility mode and a communications mode. In this case, the NEF entity may further provide a network function that authenticates, authorizes, and limits the foregoing application function.

The NSSF entity is mainly responsible for selecting a network slice instance for the UE based on Single Network Slice Selection Assistance Information (S-NSSAI). When the NSSF entity obtains the single network slice selection assistance information sent by the UE, the NSSF entity selects, based on the S-NSSAI, the network slice instance (NSI) and/or a network slice subnet instance (NSSI) serving the UE.

The UE communicates with the AMF entity through an N1 interface, the RAN communicates with the AMF entity through an N2 interface, the RAN communicates with the UPF entity through an N3 interface, the UPF entity communicates with the SMF entity through an N4 interface, the UPF entity accesses the data network through an N6 interface, and different UPF entities communicate with each other through an N9 interface. The AF entity provides services for other entities (such as the UDM entity and the PCF entity) through an Naf interface. The UDM entity provides services for other entities (such as the AF entity and the PCF entity) through an Nudm interface. The PCF entity provides services for other entities (such as the UDM entity and the NRF entity) through an Npcf interface. The NRF entity provides services for other entities (such as the NEF entity and the PCF entity) through an Nnrf interface. The NEF entity provides services for other entities (such as the NRF entity and the NSSF entity) through an Nnef interface. The NSSF entity provides services for other entities (such as the NEF entity and the NRF entity) through an Nnssf interface. The AUSF entity provides services for other entities (such as the AMF entity and NEF entity) through an Nausf interface. The AMF entity provides services for other entities (such as the AUSF entity and the SMF entity) through an Namf interface. The SMF entity provides services for other entities (such as the AUSF entity and the AMF entity) through an Nsmf interface.

A network element in the 5G network architecture further includes UE. The UE may be a device such as a mobile phone, a tablet computer, a desktop computer, a laptop computer, an ultra-mobile personal computer (UMPC), a handheld computer, a netbook, and a personal digital assistant (PDA).

Figure 2:
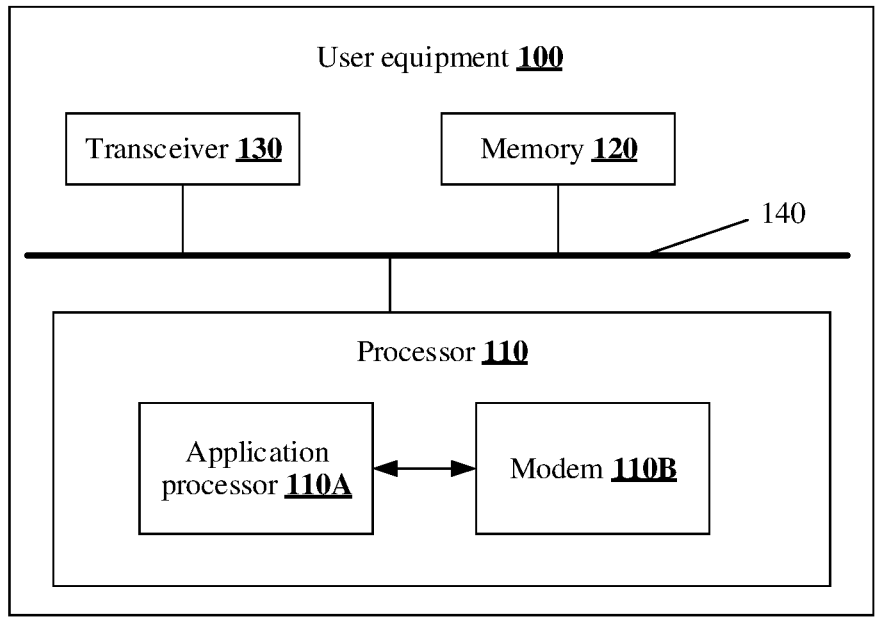
FIG. 2 is an example schematic diagram of an architecture of an Android operating system according to an embodiment of this application.

FIG. 2 is a schematic diagram of a hardware architecture of a UE according to an embodiment of this application. For ease of description, FIG. 2 shows only main components of UE 100. As shown in FIG. 2, the UE 100 may include a processor 110, a memory 120, and a transceiver 130.

The processor 110 is mainly configured to process a communications protocol and communications data, control the UE 100, execute a software program, and process data of the software program.

The processor 110 may include one or more processing units. For example, the processor 110 may include an application processor (AP) 110A and a modem 110B. In the session management method in the embodiments of this application, an application processor (AP) is described as a first processing unit, and a modem is described as a second processing unit. In addition, the processor 110 may further include a graphics processing unit (GPU), an image signal processor (ISP), a controller, a memory, a video codec, and a digital signal processor (DSP), a baseband processor, a neural-network processing unit (NPU), and/or the like. Different processing units may be independent components, or may be integrated into a same processor.

The application processor 110A may be installed in different operating systems, including but not limited to an Android operating system.

Figure 3:
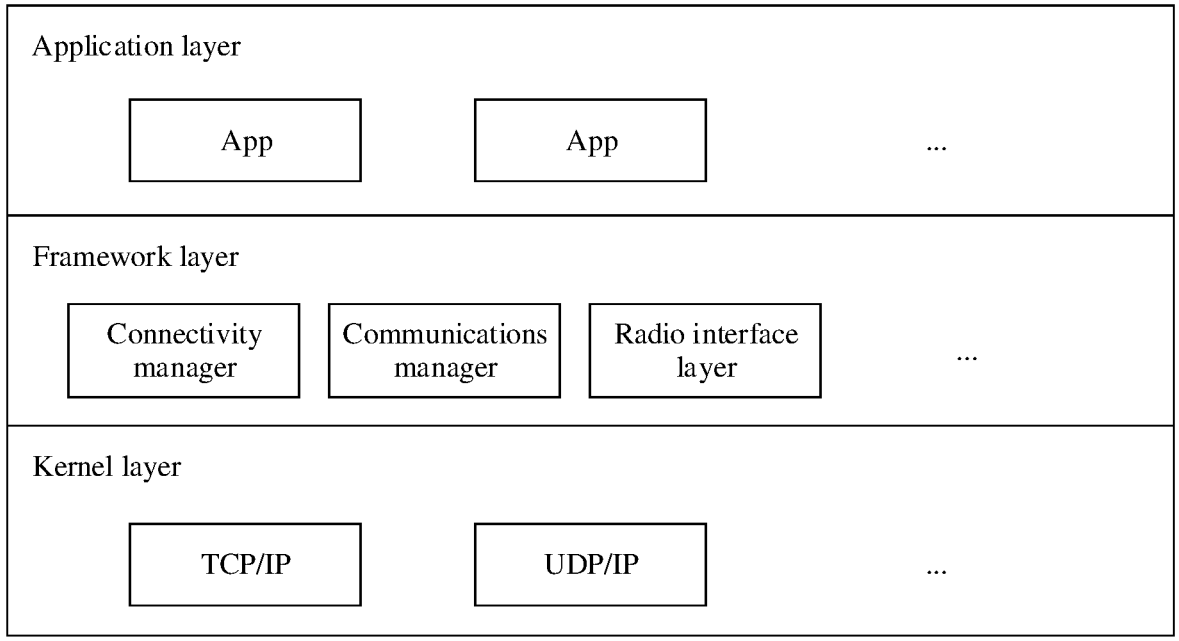
FIG. 3 is an example hierarchical schematic diagram of a communications protocol supported by user equipment according to an embodiment of this application.

The following uses an example in which an AP is installed in the Android operating system. For example, FIG. 3 is a diagram of an architecture of the Android operating system according to an embodiment of this application. Specifically, the Android operating system includes an application layer, a framework layer, and a kernel layer.

The kernel layer is used to provide process management, file network management, system security permission management, basics for communication between the system and a hardware device, and the like. For example, the kernel layer may include an input/output device driver, a network protocol stack (for example, a Transmission Control Protocol (TCP)/User Datagram Protocol (UDP), an Internet Protocol (IP)), and the like.

The framework layer is used to provide various application programming interfaces (API) that may be used when an application is constructed, for example, a connectivity manager, a telephony manager, a radio interface layer (RIL), and the like. The connectivity manager is mainly used to manage an operation related to a network connection. The communications manager is mainly used to manage information related to the UE, an operator, and the like, for example, device information, SIM card information, and network information. The radio interface layer is mainly used for reliable data transmission and command sending.

The application layer includes an application program installed on the UE, where the application program may be referred to as an application for short. The application may be a native application (for example, settings, desktop, and file management), or may be a third-party application (for example, WeChat or game).

Generally, the application processor 110A may support installation of applications (APP) with different functions, for example, applications such as graphics, presentation, word processing, game, phone, video player, music player, email, instant messaging, photo management, camera, browser, calendar, clock, payment, AppGallery, desktop, and health management, to meet different requirements of a user.

In a possible implementation, a system runtime library (e.g., libraries) layer (not shown in FIG. 2) may further be included between the kernel layer and the framework layer. The system runtime library layer provides support for an upper layer, that is, the framework layer. When the framework layer is used, a C/C++ library included in the system runtime library layer may be invoked to implement a function to be implemented by the framework layer.

The modem 110B may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor 110A. The application processor 110A outputs a sound signal by using an audio device (which is not limited to a speaker, a receiver, or the like), or displays an image or a video by using a display. In some embodiments, the modem 110B may be an independent component. In some embodiments, the modem 110B may be independent of the processor, and is disposed in a same device as a radio frequency module or another function module.

It should be noted that the modem 110B performs modulation and demodulation based on a supported protocol specified in a communications technology. The protocol specified in the communications technology in the embodiments of this application may also be referred to as a communications protocol. A communications protocol stack is a sum of communications protocols at all layers. For example, refer to FIG. 4. A communications protocol stack of the modem 110B may be divided into a control plane and a user plane that are vertically arranged. The control plane is used to transmit control signaling, and mainly includes a non-access stratum (NAS), a radio resource control (RRC) layer, a service data adaptation protocol (SDAP) layer, a packet data convergence protocol (PDCP) layer, a radio link control (RLC) layer, a media access control (MAC) layer, and a physical (PHY) layer. The user plane is used to transmit data information, and mainly includes an SDAP layer, a PDCP layer, an RLC layer, a MAC layer, and a PHY layer. It should be understood that, in different communications technologies, protocol layers of the control plane and the user plane may be divided in different manners, or may be divided in a same manner. The RRC layer, the SDAP layer, the PDCP layer, the RLC layer, the MAC layer, and the PHY layer all belong to an access stratum (AS). In the session management method in the embodiments of this application, a module that can implement an AS function is referred to as a first module, and a module that can implement a NAS function is referred to as a second module.

The memory 120 may be a read-only memory (ROM) or another type of static storage communications device that can store static information and instructions, a random access memory (RAM) or another type of dynamic storage communications device that can store information and instructions, an electrically erasable programmable read-only memory (EEPROM), a compact disc read-only memory (CD-ROM) or another compact disc storage, optical disc storage (including a compressed optical disc, a laser disc, an optical disc, a digital versatile disc, a blue-ray optical disc, and the like), a magnetic disk storage medium or another magnetic storage communications device, or any other medium that can be configured to carry or store expected program code in a form of instructions or a data structure and that can be accessed by a computer. However, the memory 120 is not limited thereto. The memory 120 may exist independently, or may be integrated with the processor 110.

The memory 120 is configured to store a software program for performing solutions of this application, and the processor 110 controls execution of the software program. For a specific implementation, refer to the following method embodiments.

The transceiver 130 may be an independently disposed transmitter, and may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in this embodiment of this application.

Optionally, the UE 100 may further include a bus 140. The processor 110, the memory 120, and the transceiver 130 may be connected to each other through the bus 140. The bus 140 may be a peripheral component interconnect (PCI for short) bus, an extended industry standard architecture (EISA for short) bus, or the like. The bus 140 may be classified into an address bus, a data bus, a control bus, and the like. For ease of representation, only one thick line is used to represent the bus in FIG. 2, but this does not mean that there is only one bus or only one type of bus.

For ease of understanding, the following specifically describes the session management method provided in the embodiments of this application with reference to the accompanying drawings.

Figure 5:
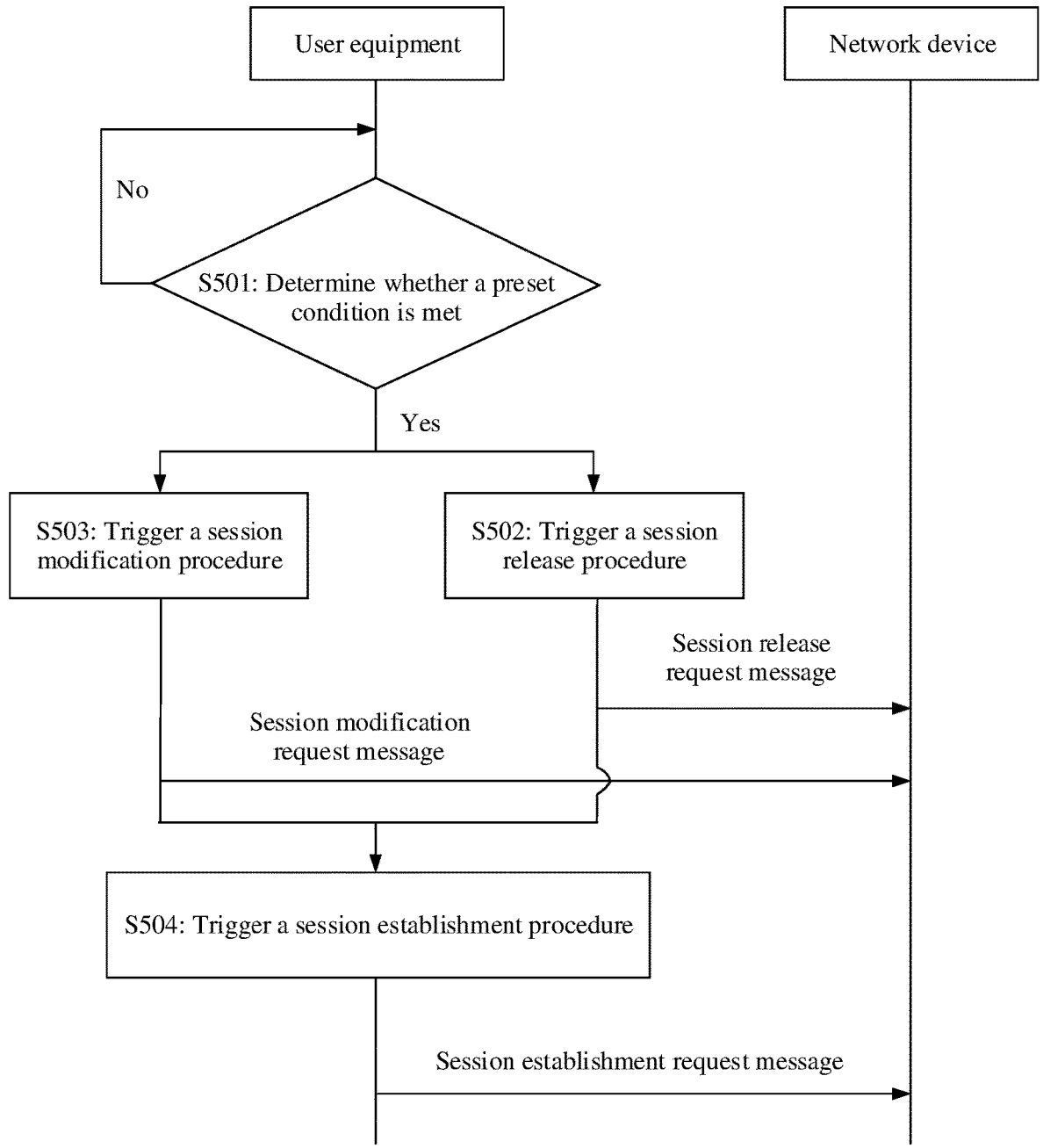
FIG. 5 is an example schematic flowchart of a session management method according to an embodiment of this application.

As shown in FIG. 5, an embodiment of this application provides a session management method that is applicable to UE in which a PDU session already exists. The PDU session already existing in the UE specifically means that the UE establishes the PDU session to a network device, and the UE stores a context of the PDU session. The UE can transmit data to the network device by using the existing PDU session. The context of the PDU session includes but is not limited to an identifier of the PDU session, information about a network slice corresponding to the PDU session, an Internet Protocol (IP) address used by the PDU session, a service and session continuity (SSC) mode of the PDU session, context information of a QoS flow, DRB information corresponding to the PDU session, and the like. There may be one or more existing PDU sessions in the UE.

In this embodiment of this application, the UE can determine a current status of the UE based on a preset condition, for example, determine a quantity of existing PDU sessions in the UE and a quantity of DRBs or QoS flows associated with the existing PDU session. The UE sends different request messages, such as a session release request message, a session modification request message, and a session establishment request message, to the network device based on the current status of the UE. Refer to FIG. 5. The session management method according to an embodiment of this application may include the following steps.

S501: The UE determines whether the preset condition is met. If the preset condition is met, the UE may perform S502 or S503. If the preset condition is not met, the UE continues to perform S501.

The preset condition may include at least one of the following items.

1. A quantity of existing PDU sessions in the UE reaches a first threshold. The first threshold is a value determined based on a maximum quantity of PDU sessions that can be established by the UE. The maximum quantity of PDU sessions that can be established by the UE is usually determined based on a minimum value in a maximum quantity of PDU sessions that can be implemented by the UE, a maximum quantity of PDU sessions supported by the network device, and a maximum quantity of PDU sessions allowed by a communications protocol. For example, the value of the first threshold is the maximum quantity of PDU sessions that can be established by the UE, or may be a value closest to the maximum quantity of PDU sessions. For example, one UE may establish a maximum of 16 PDU sessions, and the first threshold may be set to 16, or may be set to 15, 14, 13, or the like.

For example, an application processor AP in the UE determines whether a quantity of existing network connections (corresponding to the quantity of existing PDU sessions on a modem side) reaches the first threshold. Alternatively, a modem, for example, a module (the module is described as the second module in the embodiments of this application) that can implement the NAS shown in FIG. 4, determines whether the quantity of existing PDU sessions reaches the first threshold. It should be noted that each PDU session is one network connection. On the modem side, "a connection for transmitting data between the UE and a data network" is usually described as a PDU session, and on the application processor side, "a connection for transmitting data between the UE and a data network" is usually described as a network connection. The network connection herein is a network connection established by using a mobile communications technology (such as 2G, 3G, 4G, and 5G), and does not include a network connection established by using a wireless fidelity (Wi-Fi) technology.

2. The quantity of DRBs associated with the existing PDU session in the UE reaches a second threshold. The second threshold is a value determined based on a maximum quantity of DRBs that can be established by the UE. The maximum quantity of DRBs that can be established by the UE is usually determined based on a minimum value in a maximum quantity of DRBs that can be implemented by the UE, a maximum quantity of DRBs supported by the network device, and a maximum quantity of DRBs allowed by the communications protocol. For example, the value of the second threshold is the maximum quantity of DRBs that can be established by the UE, or may be a value closest to the maximum quantity of DRBs. For example, one UE may establish a maximum of 16 DRBs, and the second threshold may be set to 16, or may be set to 15, 14, 13, or the like.

Figure 4:
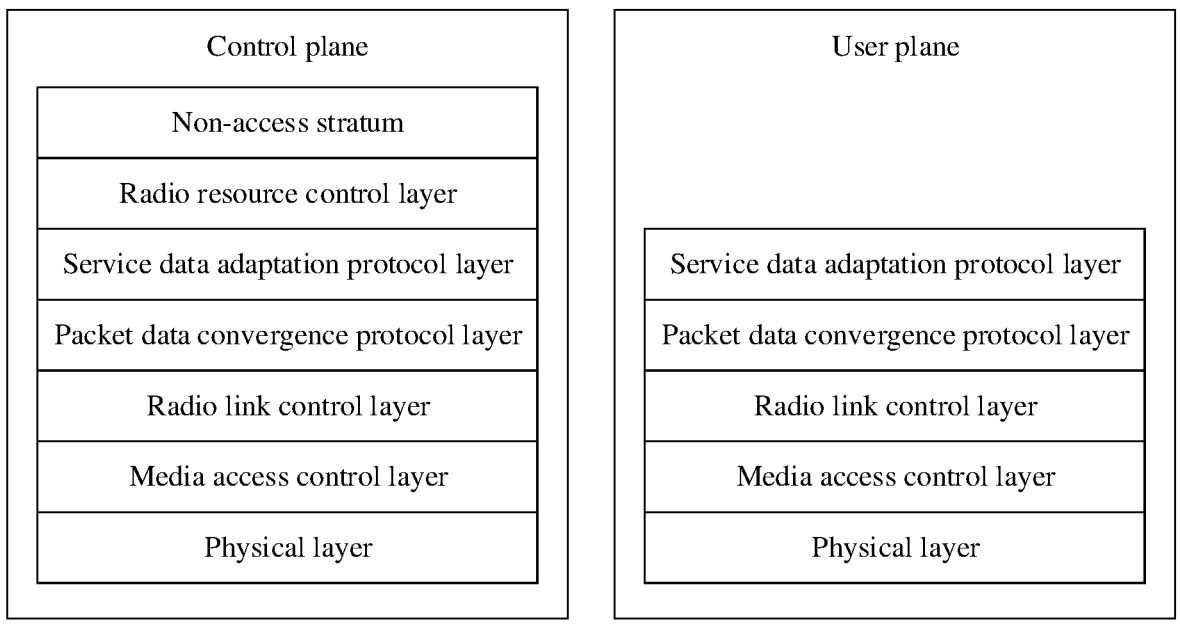
FIG. 4 is an example schematic diagram of an architecture of a communications system according to an embodiment of this application.

For example, the modem, for example, the module that can implement the NAS shown in FIG. 4, determines whether the quantity of DRBs associated with the existing PDU session reaches the second threshold.

3. The quantity of QoS flows associated with the existing PDU session in the UE reaches a third threshold. The third threshold is a value determined based on a maximum quantity of QoS flows that can be transmitted by the UE. The maximum quantity of QoS flows that can be established by the UE is usually determined based on a minimum value in a maximum quantity of QoS flows that can be implemented by the UE, a maximum quantity of QoS flows supported by the network device, and a maximum quantity of QoS flows allowed by the communications protocol. For example, the value of the third threshold is the maximum quantity of QoS flows that can be transmitted by the UE, or may be a value closest to the maximum quantity of QoS flows. For example, one UE may establish a maximum of 16 QoS flows, and the third threshold may be set to 16, or may be set to 15, 14, 13, or the like.

For example, the modem, for example, the module that can implement the NAS shown in FIG. 4, determines whether the quantity of QoS flows associated with the existing PDU session reaches the third threshold.

The foregoing three preset conditions may be that the UE periodically detects a status of the UE at a preset time interval, to determine whether the preset condition is met, or may be that the UE detects the status of the UE under a trigger condition, to determine whether the UE meets the preset condition. The trigger condition may be specifically triggering establishment of a new PDU session, or triggering establishment of a new DRB, or triggering establishment of a new QoS flow. When the UE determines that the first preset condition (that is, the quantity of existing PDU sessions in the UE reaches the first threshold) of the foregoing three preset conditions is met, the UE performs S502. When the UE determines that the second preset condition (that is, the quantity of DRBs associated with the existing PDU session in the UE reaches the second threshold) and/or the third preset condition (that is, the quantity of QoS flows associated with the existing PDU session in the UE reaches the third threshold) of the foregoing three preset conditions are/is met, the UE may perform S502 or S503.

Optionally, when an application is run on the UE, the UE determines that the existing PDU session cannot transmit data of the application. Therefore, the UE needs to establish a second PDU session to transmit the data of the application. If the UE determines that the second PDU session needs to be established and the first preset condition of the foregoing three preset conditions is met, the UE performs S502 and S504. If the UE determines that the second PDU session needs to be established and the second preset condition and/or the third preset condition of the foregoing three preset conditions are/is met, the UE may perform S502 and S504, or may perform S503 and S504. If the UE determines that the second PDU session needs to be established and none of the foregoing three preset conditions is met, the UE performs S504.

For example, the application processor in the UE determines whether a second network connection needs to be established (corresponding to establishing the second PDU session on the modem side). Alternatively, the modem, for example, the module that can implement the NAS shown in FIG. 4, determines whether the second PDU session needs to be established.

It should be noted that, the application processor can obtain the quantity of existing network connections in the UE (corresponding to the quantity of existing PDU sessions on the modem side) in real time. For example, the application processor determines the quantity of existing network connections in the UE based on a stored context of the network connection, such as an identifier of the network connection.

The module that is in the modem and that can implement the NAS function shown in FIG. 4, that is, the second module, can also obtain the quantity of existing PDU sessions in the UE in real time. For example, the second module determines the quantity of existing PDU sessions in the UE based on a stored context of the PDU session, for example, an identifier of the PDU session.

The module that is in the modem and that can implement the NAS function shown in FIG. 4, that is, the second module, can also obtain, in real time, the quantity of QoS flows associated with the existing PDU session in the UE. For example, the second module determines, based on stored context information of the QoS flow, the quantity of QoS flows associated with the existing PDU session in the UE.

The module that is in the modem and that can implement the NAS function shown in FIG. 4, that is, the second module, can obtain, in real time, the quantity of DRBs associated with the existing PDU session in the UE. For example, the quantity of DRBs associated with the existing PDU session may be transmitted by the first module to the second module. The first module, for example, the module that implements an RRC layer function shown in FIG. 4, belongs to an access stratum. The second module, for example, the module that implements the NAS function shown in FIG. 4, belongs to a non-access stratum.

In any one of the following cases, the quantity of DRBs associated with the existing PDU session may be transmitted by the first module to the second module. Refer to FIG. 4. It may be specifically implemented that the quantity of DRBs associated with the existing PDU session may be transmitted by the RRC layer to the NAS.

1. The RRC layer determines that the quantity of DRBs associated with the existing PDU session changes. For example, when the RRC layer determines to add or delete a specific quantity of DRBs, the RRC layer sends the quantity of DRBs associated with the existing PDU session to the NAS.

2. If the RRC layer determines that a correspondence between the QoS flow and an established DRB changes, the RRC layer sends the quantity of DRBs associated with the existing PDU session to the NAS.

3. If the RRC layer determines that the quantity of DRBs associated with the existing PDU session reaches the second threshold, the RRC layer sends the quantity of DRBs associated with the existing PDU session to the NAS, or the RRC layer sends status information to the NAS, to indicate that the quantity of DRBs associated with the existing PDU session reaches the second threshold.

4. The NAS sends a first request message to the RRC layer. Accordingly, after receiving the first request message sent by the NAS, the RRC layer sends the quantity of DRBs associated with the existing PDU session to the NAS. The first request message may be used by the NAS to request the RRC layer to obtain a current quantity of DRBs.

In this way, the non-access stratum module can obtain the quantity of DRBs associated with the existing PDU session. That is, an interaction mechanism between the access stratum and the non-access stratum is added, so that the non-access stratum can determine whether the quantity of DRBs associated with the existing PDU session reaches the second threshold. Therefore, when determining that the quantity of DRBs associated with the existing PDU session reaches the second threshold, the UE requests to release a first PDU session, or requests to release a first QoS flow. This saves communications resources. Even if the UE establishes a new second PDU session, a phenomenon that the session establishment request message is rejected does not exist. This improves a PDU session establishment success rate.

S502: The UE triggers a session release procedure.

The network device (for example, the SMF and the UPF) and the UE may jointly complete the session release procedure. The session release procedure includes: the UE sends a session release request message to the network device, where the session release request message is used to request to release a PDU session that meets a specific condition in the existing PDU sessions in the UE. The PDU session is described as the first PDU session in the embodiments of this application. The UE may delete context information of the PDU session corresponding to the first PDU session. For a detailed implementation process of the session release procedure, refer to the current technology.

For example, the module in the modem that can implement the NAS function shown in FIG. 4, that is, the second module, triggers the session release procedure, to release the first PDU session. There may be one or more first PDU sessions.

Optionally, the first PDU session meets at least one of the following items.

1. The first PDU session is a local area data network (LADN) session, and the UE is located outside a service area of the LADN session. The LADN session is a connection through which the UE accesses a LADN, and data is transmitted between the UE and the LADN through the connection. During registration of the UE, the AMF provides LADN information to the UE, including but not limited to the service area of the LADN. The LADN session can be established between the UE and the LADN only when the UE is in the service area of the LADN. When the UE is located outside the service area of the LADN, data cannot be transmitted between the UE and the LADN. If the UE moves out of the service area of the LADN, accordingly, a core network (CN) triggers a procedure of releasing a user plane connection of the LADN session. The procedure of releasing the user plane connection of the LADN session also needs to be performed by the UE. The user plane connection is a connection between the UE and the network element UPF in the core network, and includes a DRB between the RAN and the UE and a connection of an N3 interface between the RAN and the UPF. A service area of one LADN session may be a set of a series of location areas. For example, the location area may be a tracking area (TA), and one TA may be identified by using a tracking area code (TAC). The service area of the LADN may be represented by using a TAC set corresponding to the foregoing series of TAs. The UE can determine a TA in which the UE is actually located. If a TAC corresponding to the TA in which the UE is actually located belongs to the TAC set of the LADN, the UE is located in the service area of the LADN session. If a TAC corresponding to the TA in which the UE is actually located does not belong to the TAC set of the LADN, the UE is located outside the service area of the LADN session. For another example, the location area may be a series of cells, and one cell may be identified by using an evolved universal terrestrial radio access network cell global identifier (E-UTRAN cell global identifier, ECGI). The service area of the LADN may be represented by using an ECGI set corresponding to the foregoing series of cells. If an ECGI corresponding to the cell in which the UE is actually located belongs to the ECGI set of the LADN, the UE is located in the service area of the LADN session. If an ECGI corresponding to the cell in which the UE is actually located does not belong to the ECGI set of the LADN, the UE is located outside the service area of the LADN session. For another example, the location area may be a cell or some cells covered by a base station, and the service area of the LADN may be represented by using a set of identifiers of base stations corresponding to the foregoing series of cells. If an identifier of a base station corresponding to the cell in which the UE is actually located belongs to the set of the identifiers of the base stations of the LADN, the UE is located in the service area of the LADN session. If an identifier of a base station corresponding to the cell in which the UE is actually located does not belong to the set of the identifiers of the base stations of the LADN, the UE is located outside the service area of the LADN session.

2. A user plane connection of the first PDU session is in an unestablished state. The user plane connection of the first PDU session is a connection between the UE and the UPF, and includes the DRB between the RAN and the UE and the connection of the N3 interface between the RAN and the UPF. The user plane connection of the first PDU session being in the unestablished state means that either of the DRB and the connection of the N3 interface exists. For example, the DRB between the UE and the RAN does not exist, or the connection of the N3 interface between the RAN and the UPF does not exist, or neither of the DRB and the connection of the N3 interface exists. If the user plane connection of the first PDU session changes from an established state to the unestablished state, the context information of the corresponding PDU session changes. For example, in the context information of the PDU session, if DRB information corresponding to the PDU session is deleted, the UE may determine, based on the context information of the PDU session, whether the PDU session is in the unestablished state.

3. Duration in which the user plane connection of the first PDU session is in the unestablished state is greater than duration in which a user plane connection of a third PDU session is in the unestablished state. The third PDU session is any PDU session that is in the existing PDU sessions in the UE and that is different from the first PDU session. That is, in the existing PDU sessions in the UE, the first PDU session is a PDU session in which the user plane connection is in the unestablished state for the longest duration. The UE may determine, based on the context information of the PDU session, whether a user plane connection of the PDU session is in the unestablished state and duration in which the user plane connection of the PDU session is in the unestablished state.

4. A quantity of QoS rules associated with the first PDU session is less than a quantity of QoS rules associated with the third PDU session. The third PDU session is any PDU session that is in the existing PDU sessions in the UE and that is different from the first PDU session. That is, in the existing PDU sessions in the UE, the first PDU session is a PDU session with a minimum quantity of associated QoS rules. The UE may determine, based on the stored context information of the PDU session, a quantity of QoS rules associated with each PDU session. Because each PDU session may include one or more QoS flows, a small quantity of QoS rules that are associated with a QoS flow in a PDU session reflects, to some extent, a small quantity of applications that are associated with the QoS flow in the PDU session, or a small quantity of data flows that are managed by the QoS flow in the PDU session. In this way, if the first PDU session is released, impact on an application is relatively small.

5. A quantity of applications associated with the first PDU session is less than a quantity of applications associated with the third PDU session. The third PDU session is any PDU session that is in the existing PDU sessions in the UE and that is different from the first PDU session. That is, in the existing PDU sessions in the UE, the first PDU session is a PDU session with a minimum quantity of associated applications. The UE may determine, based on the stored context information of the PDU session, an application associated with each PDU session.

6. The first PDU session is not associated with a specified application. That is, for the modem, the first PDU session does not carry data of the specified application. For the application processor, the first network connection is not bound to the specified application. The specified application may be an application that meets an importance level, for example, an application that has a relatively high importance level such as WeChat or game. The UE may determine, based on the stored context information of the PDU session, or based on an application bound to a network connection corresponding to the PDU session on the application processor side, the application associated with each PDU session.

It should be noted that each PDU session is a network connection, and the network connection is bound to an IP address of the PDU session. On the modem side, "a connection for transmitting data between the UE and the data network" is usually described as a PDU session, and on the application processor side, "a connection for transmitting data between the UE and the data network" is usually described as a network connection.

In this way, the session management method in the embodiments of this application can determine the first PDU session from the existing PDU sessions in the UE, and release the first PDU session that has minimal impact on a service, so that the quantity of the existing PDU sessions in the UE no longer reaches the first threshold. Because the first PDU session is a PDU session that meets at least one of the foregoing items, the first PDU session has minor impact on the service of the UE. In this case, even if the UE needs to establish the new second PDU session, the session establishment request message sent by the UE is not rejected by the network device. This improves a PDU session establishment success rate.

It should be noted that the application processor in the UE determines a first network connection (corresponding to the first PDU session in the modem). Alternatively, the modem, for example, the module at the NAS, determines the first PDU session.

For example, the first PDU session determined by the module at the NAS may be a PDU session that meets any one of the foregoing first to fourth items. In an actual application process, the NAS may preferentially select a first PDU session whose UE is located outside the service area of the LADN session, then select a first PDU session whose user plane connection is in the unestablished state for the longest duration, then select a first PDU session whose user plane connection is in the unestablished state, and finally select a first PDU session with a minimum quantity of associated QoS rules. The first PDU session determined by the module at the NAS may alternatively be a PDU session that meets any plurality of the foregoing first to fourth items. For example, the NAS may preferentially select a first PDU session whose user plane connection is in the unestablished state for the longest duration and that has a minimum quantity of associated QoS rules, and then select a first PDU session whose user plane connection is in the unestablished state and that has a minimum quantity of associated QoS rules, and finally select a first PDU session in which the UE is located outside the service area of the LADN session.

The first PDU session determined by the application processor in the UE may be a network connection (that is, the first PDU session that meets the second item, the fifth item, or the sixth item) that meets the second item, the fifth item, or the sixth item. For example, the AP may preferentially select a first network connection (that is, the first PDU session) whose user plane connection is in the unestablished state, then select a first network connection (that is, the first PDU session) that is not associated with the specified application, and finally select a first network connection (that is, the first PDU session) with a minimum quantity of associated applications. The first network connection (that is, the first PDU session) determined by the application processor in the UE may alternatively be a network connection that meets any plurality of the second item, the fifth item, and the sixth item. For example, the AP may preferentially select, from a plurality of network connections (that is, the PDU sessions corresponding to the modem side) whose user plane connections are in the unestablished state, a first network connection (that is, the first PDU session) that is not associated with the specified application and that is associated with a minimum quantity of applications, and then select a first network connection (that is, the first PDU session) that is not associated with the specified application.

S503: The UE triggers a session modification procedure.

The network device (for example, the SMF and the UPF) and the UE may jointly complete the session modification procedure. The session modification procedure includes: the UE sends a session modification request message to the network device, where the session modification request message is used to request to release a QoS flow that meets a specific condition in the existing PDU session in the UE. The QoS flow is described as a first QoS flow in the embodiments of this application. For a detailed implementation process of the session modification procedure, refer to the current technology.

For example, the module in the modem that can implement the NAS function shown in FIG. 4, that is, the second module, triggers the session modification procedure, to release the first QoS flow. There may be one or more first QoS flows.

Optionally, the first QoS flow meets at least one of the following items.

1. A DRB to which the first QoS flow is mapped has a correspondence with only the first QoS flow. That is, only the first QoS flow is transmitted through the DRB to which the first QoS flow is mapped. The UE may determine, based on the correspondence between the QoS flow and the DRB, a DRB to which each QoS flow is mapped and a QoS flow transmitted through each DRB. Herein, if a ratio of a quantity of first QoS flows to a quantity of DRBs in the correspondence is 1:1, that is, the DRB is used to carry data of only one QoS flow over an air interface, the DRB does not carry another QoS flow. In this case, there is one first QoS flow, and one DRB is accordingly released after the first QoS flow is released. If the ratio of the quantity of first QoS flows to the quantity of DRBs in the correspondence is N:1, a value of N is a positive integer greater than 1. In other words, the DRB is used to carry data of only a plurality of QoS flows over the air interface, and the plurality of QoS flows may be uniformly described as the first QoS flow. In this case, there are a plurality of first QoS flows, and one DRB is accordingly released after the plurality of QoS flows (that is, the first QoS flow) are released.

2. A quantity of QoS rules associated with the first QoS flow is less than a quantity of QoS rules associated with a second QoS flow. The second QoS flow is any QoS flow that is in the existing PDU session in the UE and that is different from the first QoS flow. That is, in the QoS flows associated with the existing PDU session in the UE, the first QoS flow is a QoS flow associated with a minimum quantity of QoS rules. The UE may determine, based on context information of the QoS flow, a QoS rule associated with each QoS flow. A small quantity of QoS rules associated with the QoS flow reflects, to some extent, a small quantity of applications associated with the QoS flow or a small quantity of data flows managed by the QoS flow. In this way, if the first QoS flow is released, impact on an application is small.

3. A quantity of applications associated with the first QoS flow is less than a quantity of applications associated with the second QoS flow. The second QoS flow is any QoS flow that is in the existing PDU session in the UE and that is different from the first QoS flow. That is, in the QoS flows associated with the existing PDU session in the UE, the first QoS flow is a QoS flow associated with a minimum quantity of applications. The UE may determine, based on the context information of the QoS flow, an application associated with each QoS flow.

4. The first QoS flow is not associated with a specified application. The specified application may be an application that meets an importance level, for example, an application that has a relatively high importance level such as WeChat or game. The UE may determine, based on the context information of the QoS flow, an application associated with each QoS flow.

In this way, the session management method in the embodiments of this application can determine the first QoS flow from the plurality of QoS flows associated with the existing PDU session in the UE, to release the first QoS flow that has minimal impact on a service, and implement session modification, so that the quantity of DRBs associated with the existing PDU session in the UE no longer reaches the second threshold, or the quantity of QoS flows associated with the existing PDU session in the UE no longer reaches the third threshold. Because the first QoS flow is a QoS flow that meets at least one of the foregoing items, the first QoS flow has minor impact on the service of the UE. In this case, even if the UE needs to establish the new second PDU session, the session establishment request message sent by the UE is not rejected by the network device. This improves a PDU session establishment success rate.

Optionally, the modem, for example, the module at the NAS, determines the first QoS flow. The first QoS flow determined by the module at the NAS may be a QoS flow that meets any one of the foregoing first to fourth items. For example, the NAS may select a first QoS flow associated with a minimum quantity of applications, or may select a first QoS flow not associated with the specified application. The first QoS flow determined by the module at the NAS may alternatively be a QoS flow that meets any one of the foregoing first to fourth items. For example, the NAS may select a first QoS flow associated with a minimum quantity of QoS rules and a minimum quantity of applications.

The module at the NAS, that is, the second module, may determine the first QoS flow based on the correspondence between the QoS flow and the DRB. The second module may obtain the correspondence between the QoS flow and the DRB from the first module. The first module, for example, the module that implements the RRC layer function, belongs to the access stratum. When sending the "quantity of DRBs associated with the existing PDU session" to the second module, the first module may send the correspondence between the QoS flow and the DRB at the same time, or may not send the correspondence and the "quantity of DRBs associated with the existing PDU session" at the same time. The first module may send the correspondence between the QoS flow and the DRB to the second module as long as any one of the following cases is met. Refer to FIG. 4. It may be specifically implemented that the RRC layer in the access stratum sends the correspondence between the QoS flow and the DRB to the NAS.

1. The RRC layer determines that the quantity of DRBs associated with the existing PDU session changes. The RRC layer sends the correspondence between the QoS flow and the DRB to the NAS.

2. The RRC layer determines that the correspondence between the QoS flow and the established DRB changes. The RRC layer sends the correspondence between the QoS flow and the DRB to the NAS.

3. The RRC layer determines that the quantity of DRBs associated with the existing PDU session reaches the second threshold. The RRC layer sends the correspondence between the QoS flow and the DRB to the NAS, or when sending status information (status information indicating that the quantity of DRBs associated with the existing PDU session reaches the second threshold) to the NAS, the RRC layer sends the correspondence between the QoS flow and the DRB to the NAS.

4. The NAS sends a second request message to the RRC layer. Accordingly, after receiving the second request message sent by the NAS, the RRC layer sends the correspondence between the QoS flow and the DRB to the NAS. The second request message may be used by the NAS to request, from the RRC layer, to obtain the correspondence between the QoS flow and the DRB.

It should be noted that, in an actual application process, the first request message and the second request message may be a same request message. In this way, after sending a request message to the RRC layer, the NAS can obtain a quantity of current DRBs and the correspondence between the QoS flow and the DRB from the RRC layer. The first request message and the second request message may be two request messages. In this way, after sending the first request message to the RRC layer, the NAS can obtain the quantity of current DRBs from the RRC layer, and after sending the second request message to the RRC layer, the NAS can obtain the correspondence between the QoS flow and the DRB from the RRC layer. This is not limited in the embodiments of this application.

S504: The UE triggers a session establishment procedure.

The network device (for example, the SMF and the UPF) and the UE may jointly complete the session establishment procedure. The session establishment procedure includes: the UE sends a session establishment request message to the network device, where the session establishment request message is used to request to establish a second PDU session. For a detailed implementation process of the session establishment procedure, refer to the current technology.

For example, the module in the modem that can implement the NAS function shown in FIG. 4, that is, the second module, triggers the session establishment procedure, to establish the new second PDU session.

According to the session management method provided in the embodiments of this application, when the UE that has the PDU session determines that a preset condition is met, the UE can send a session release request message or a session modification request message to the network device. The session release request message is used to request to release the first PDU session, the session modification request message is used to request to release the QoS flow, and the first PDU session is one of the existing PDU sessions in the UE. The preset condition includes at least one of the following: a quantity of existing PDU sessions in the UE reaches the first threshold; a quantity of DRBs associated with the existing PDU session in the UE reaches the second threshold; and a quantity of QoS flows associated with the existing PDU session in the UE reaches the third threshold. In the current technology, when a quantity of existing PDU sessions in the UE reaches a first threshold, or a quantity of DRBs associated with the existing PDU session in the UE reaches a second threshold, or a quantity of QoS flows associated with the existing PDU session in the UE reaches a third threshold, if the UE needs to establish a new second PDU session, a session establishment request message sent by the UE is rejected by the network device, and a PDU session establishment success rate is low. However, in the session management method in the embodiments of this application, the UE can determine whether the preset condition is met. When the UE meets the preset condition, the UE sends the session release request message to the network device, to request to release the first PDU session in the existing PDU session in the UE, or the UE sends the session modification request message to the network device, to request to release the first QoS flow in the existing PDU session in the UE, so that a DRB between the UE and the RAN can be released. This saves communications resources. Even if the UE needs to establish a new second PDU session, a phenomenon that a session establishment request message is rejected by the network device does not exist, so that the new PDU session is successfully established. This improves a PDU session establishment success rate, and reduces a service data transmission delay.

The following describes in detail the session management method provided in the embodiments of this application by using an example in which "the UE automatically determines the quantity of existing PDU sessions and the quantity of DRBs, and sends different request messages to the network device based on the determined quantity of PDU sessions and the quantity of DRBs".

Figure 6:
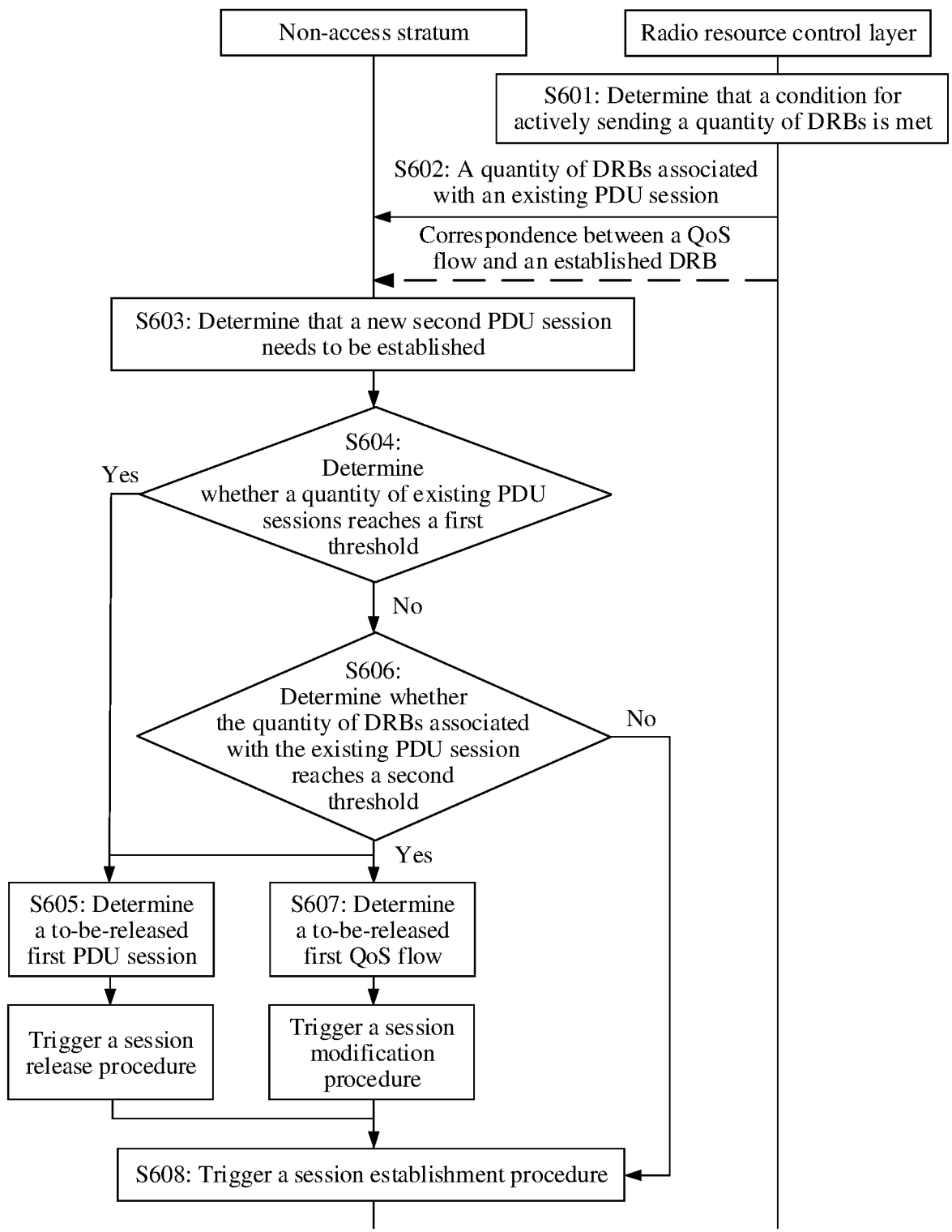
FIG. 6 is an example schematic flowchart of another session management method according to an embodiment of this application.

Example 1: Refer to FIG. 3, FIG. 4, and FIG. 6. The NAS in the UE can determine whether the quantity of existing PDU sessions and the quantity of DRBs reach an upper limit, and the NAS receives, in a "passive receiving" manner in real time, a quantity of DRBs transmitted by the RRC layer. The specific implementation process is as follows.

S601: The RRC layer determines that a condition for actively sending the quantity of DRBs is met.

The condition for actively sending the quantity of DRBs includes any one of the following three items: 1. The quantity of DRBs associated with the existing PDU session changes. 2. The correspondence between the QoS flow and the established DRB changes. 3. The quantity of DRBs associated with the existing PDU session reaches the second threshold.

The RRC layer belongs to the access stratum. The RRC layer can manage, in real time, a DRB established by the UE, and can obtain, in real time, the quantity of DRBs associated with the existing PDU session in the UE and the correspondence between the QoS flow and the DRB.

S602: The RRC layer sends the quantity of DRBs associated with the existing PDU session to the NAS. Accordingly, the NAS receives the quantity of DRBs associated with the existing PDU session sent by the RRC layer.

Optionally, the RRC layer may further send the correspondence between the QoS flow and the established DRB to the NAS. Accordingly, the NAS receives the correspondence between the QoS flow and the established DRB that is sent by the RRC layer, as shown by a dashed arrow in FIG. 6. For example, when the RRC layer determines that the quantity of DRBs associated with the existing PDU session reaches the second threshold, the RRC layer sends the correspondence between the QoS flow and the established DRB to the NAS.

S603: The NAS determines that the new second PDU session needs to be established.

For example, when an application is run on the UE, the UE determines that the existing PDU session cannot transmit data of the application. Therefore, the UE needs to establish the second PDU session to transmit the data of the application.

S604: The NAS determines whether the quantity of existing PDU sessions reaches the first threshold. If the quantity of existing PDU sessions reaches the first threshold, S605 is performed; and if the quantity of existing PDU sessions does not reach the first threshold, S606 is performed.

The first threshold is a value determined based on a maximum quantity of PDU sessions that can be established by the UE.

S605: The NAS determines a to-be-released first PDU session. The NAS may trigger the session release procedure to release the first PDU session.

The first PDU session is one of the existing PDU sessions in the UE. For the first PDU session determined by the NAS, refer to related descriptions of "the first PDU session" in S502.

S606: The NAS determines whether the quantity of DRBs associated with the existing PDU session reaches the second threshold. If the quantity of DRBs associated with the existing PDU session reaches the second threshold, S607 or S605 is performed; and if the quantity of DRBs associated with the existing PDU session does not reach the second threshold, S608 is performed.

The quantity of DRBs associated with the existing PDU session is a value obtained by the NAS from the RRC layer.

S607: The NAS determines a to-be-released first QoS flow. The NAS may trigger the session modification procedure to release the first QoS flow.

The first QoS flow is one of the QoS flows associated with the existing PDU session in the UE. For the first QoS flow determined by the NAS, refer to related descriptions of "the first QoS flow" in S503.

S608: The NAS triggers the session establishment procedure.

It should be noted that after performing the session release procedure, the UE may perform the session establishment procedure. For example, after performing S605, the UE may perform S608 to establish the new second PDU session. Similarly, after performing the session modification procedure, the UE may perform the session establishment procedure. For example, after performing S607, the UE performs S608 to establish the new second PDU session.

Compared with the current technology, the session management method in the embodiments of this application provides an interaction mechanism between the access stratum and the non-access stratum. In this way, the NAS may determine whether the quantity of DRBs associated with the existing PDU session in the UE reaches the second threshold. The session management method in the embodiments of this application further provides a mechanism for the NAS to determine the to-be-released first PDU session or first QoS flow. In this way, when the UE determines that the quantity of existing PDU sessions in the UE reaches the first threshold, the UE can select and release a first PDU session that has minimum impact on a service, and an existing PDU session in the UE that is not released has a relatively high possibility of transmitting data. This improves communications resource utilization. In addition, the session establishment request message initiated by the UE is not rejected by the network device. This improves a PDU session establishment success rate, and reduces a service data transmission delay. Similarly, when the UE determines that the quantity of existing PDU sessions in the UE does not reach the first threshold, but the quantity of DRBs associated with the existing PDU session in the UE reaches the second threshold, the UE can select and release the first PDU session that has the minimal impact on the service, or the UE can select and release a first QoS flow that has minimal impact on the service. This can also avoid a phenomenon that "the session establishment request message initiated by the UE is rejected by the network device," and improve the PDU session establishment success rate.

Figure 7:
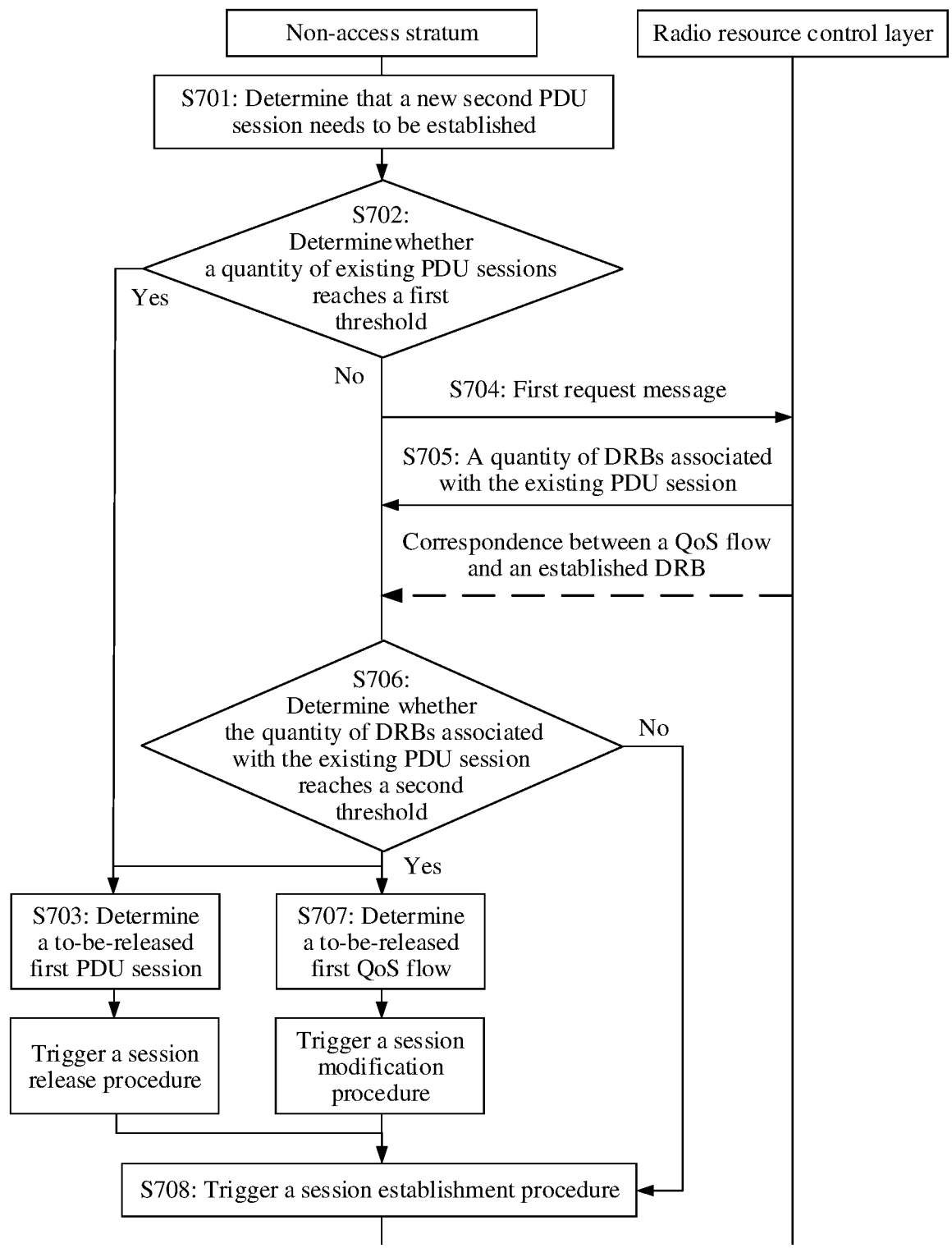
FIG. 7 is an example schematic flowchart of still another session management method according to an embodiment of this application.
Figure 8A:
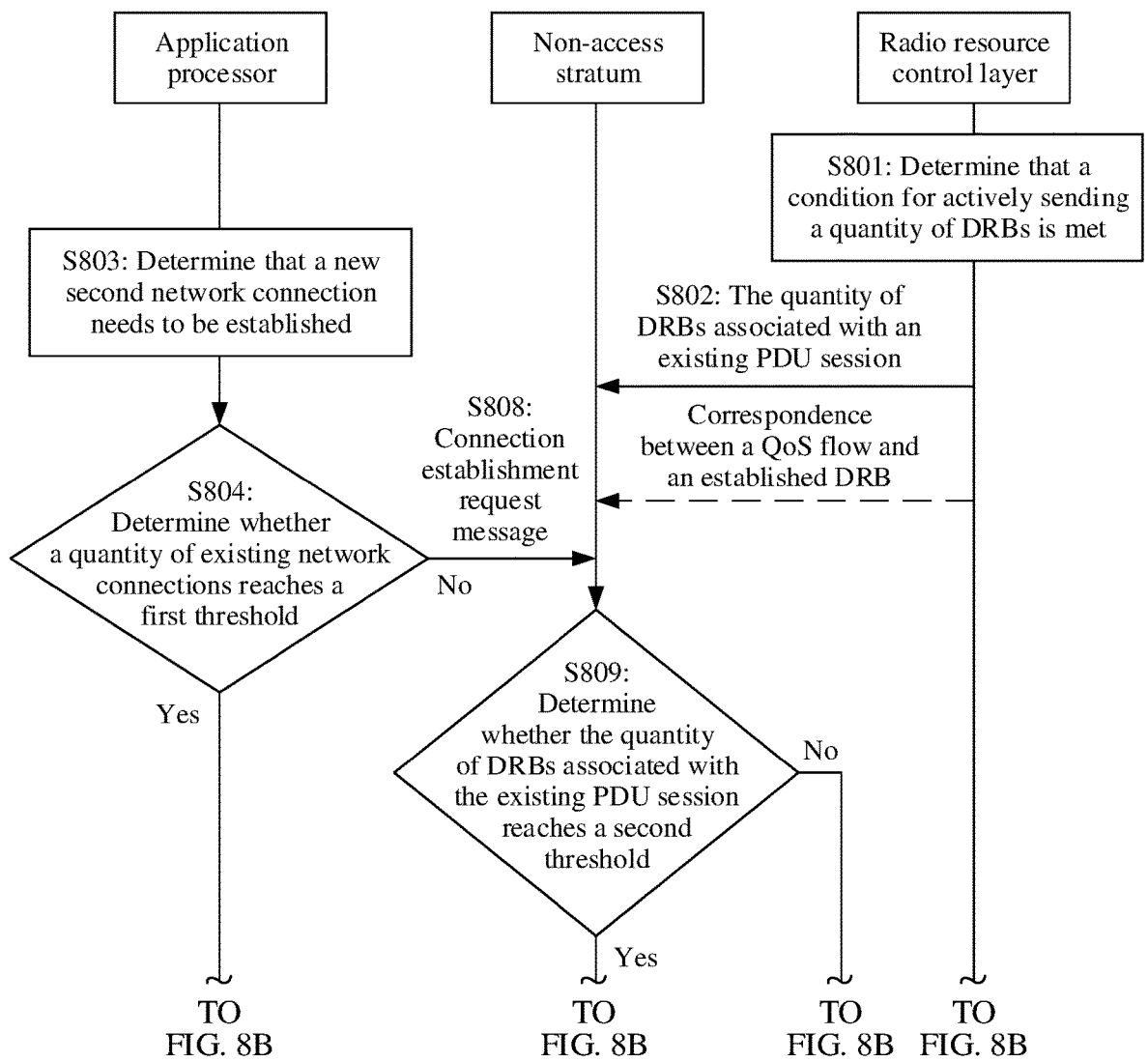
FIG. 8A and FIG. 8B are example schematic flowcharts of yet another session management method according to an embodiment of this application.
Figure 8B:
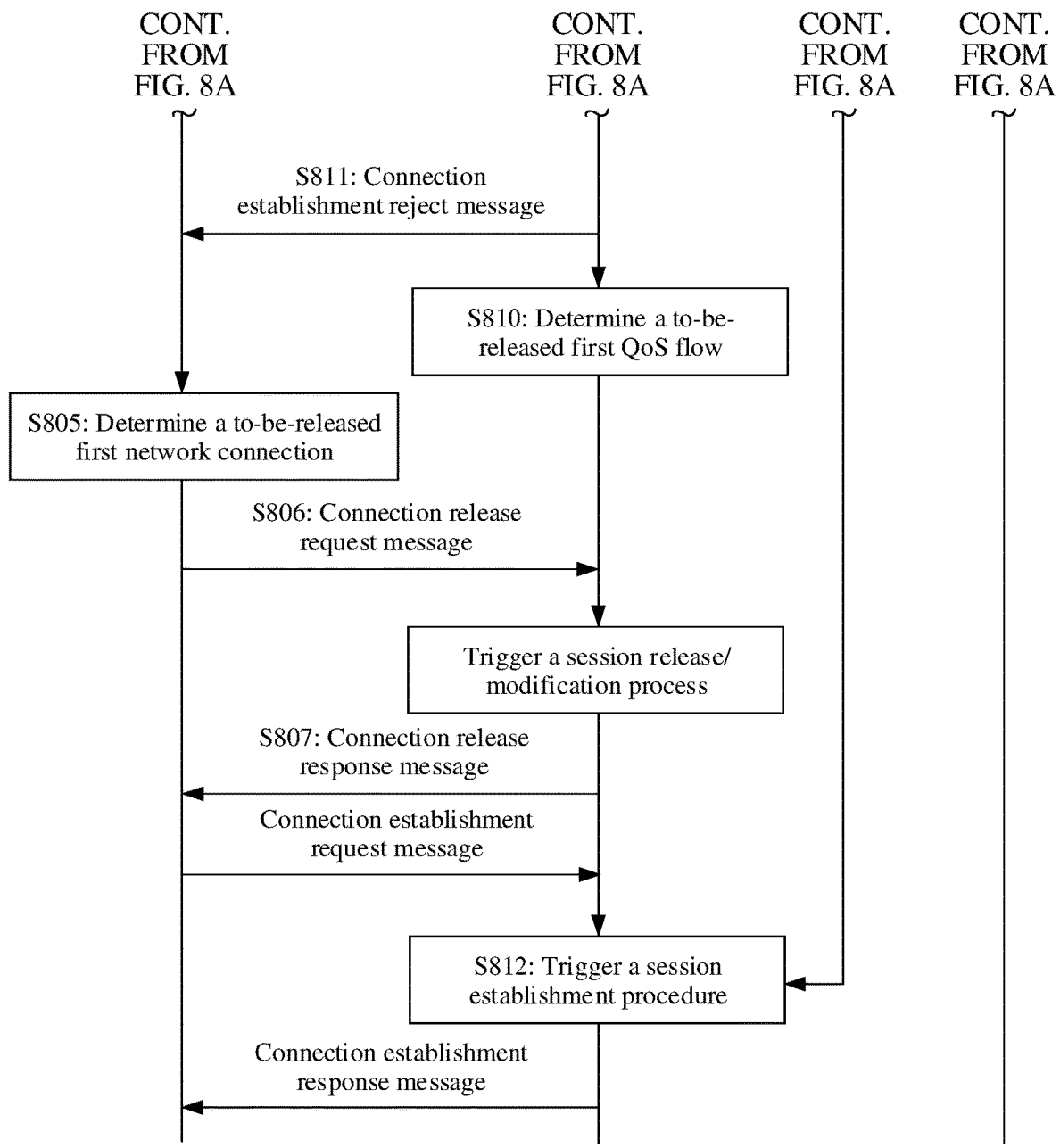
Figure 9A:
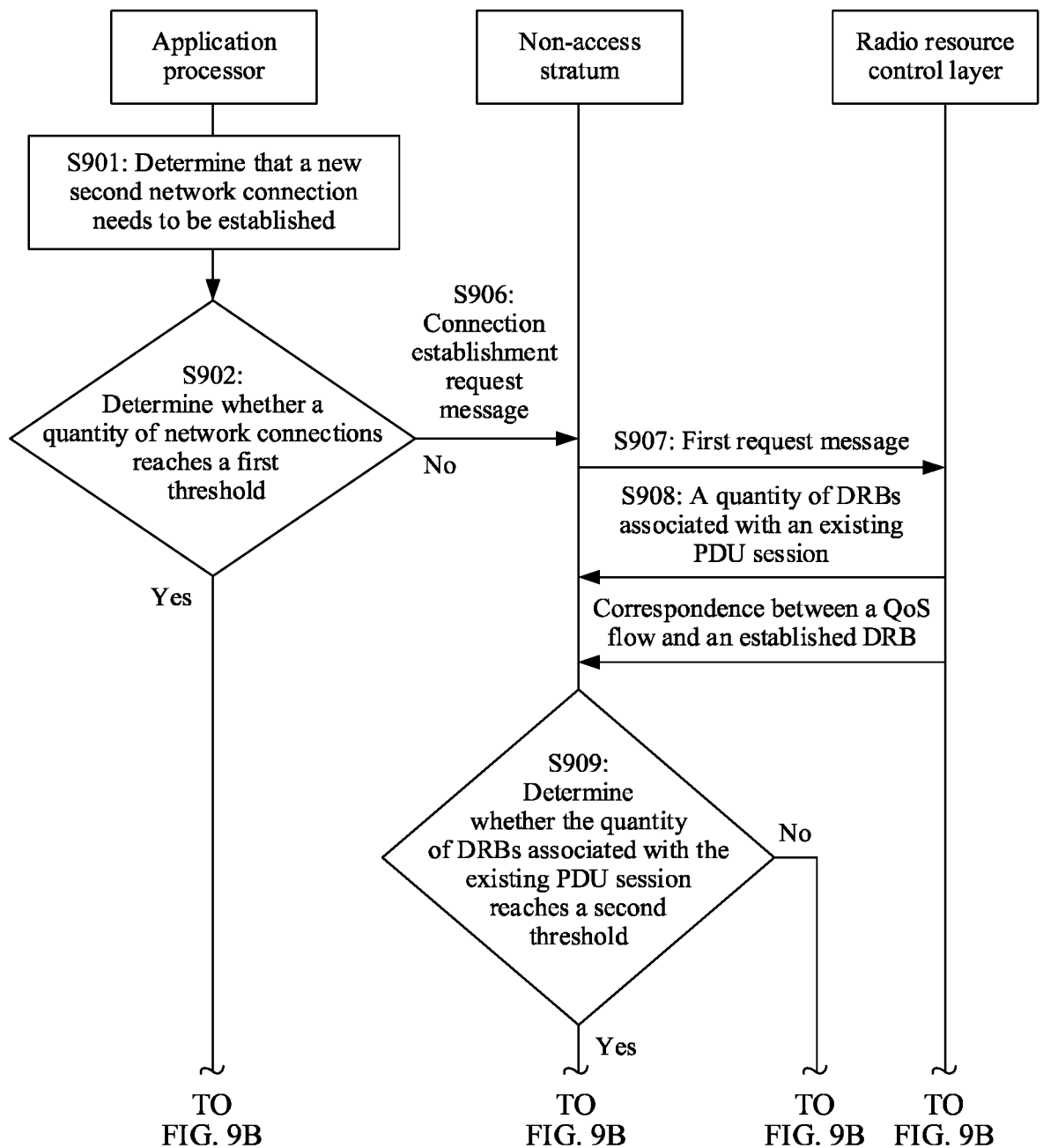
FIG. 9A and FIG. 9B are example schematic flowcharts of still yet another session management method according to an embodiment of this application.
Figure 9B:
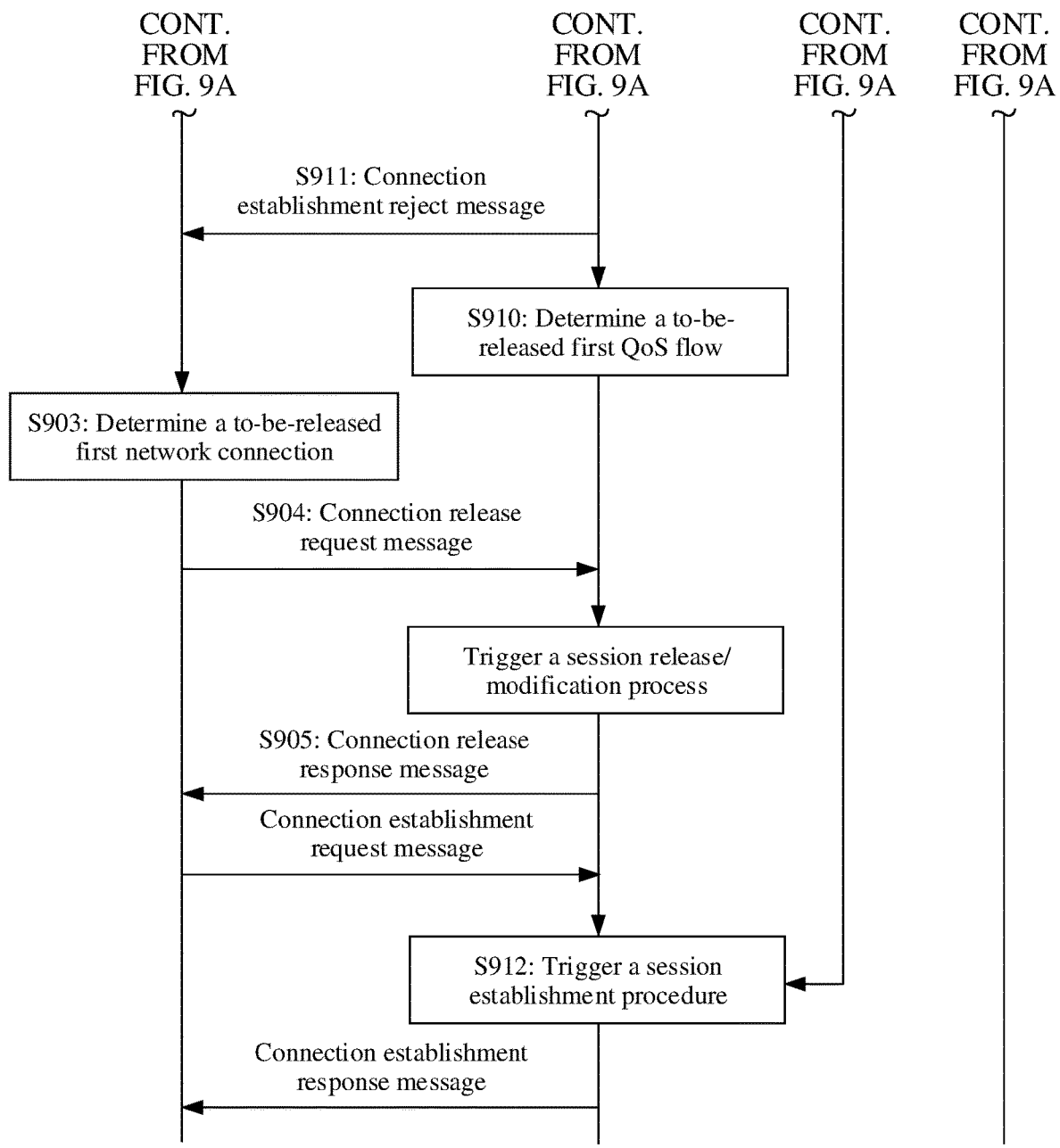

Example 2: Refer to FIG. 3, FIG. 4, and FIG. 7. The NAS in the UE can determine whether the quantity of existing PDU sessions and the quantity of DRBs reach an upper limit, and the NAS obtains, in an "active requesting" manner, the quantity of DRBs from the RRC layer when the NAS requires "the quantity of DRBs associated with the existing PDU session." The specific implementation process is as follows.

S701: The NAS determines that the new second PDU session needs to be established.

S702: The NAS determines whether the quantity of existing PDU sessions reaches the first threshold. If the quantity of existing PDU sessions reaches the first threshold, S703 is performed; and if the quantity of existing PDU sessions does not reach the first threshold, S704 is performed.

S703: The NAS determines a to-be-released first PDU session, and may trigger the session release procedure to release the first PDU session.

For a detailed implementation process of S703, refer to related descriptions of S605.

S704: The NAS sends a first request message to the RRC layer.

Accordingly, the RRC layer receives the first request message sent by the NAS. The first request message is used by the NAS to obtain a current quantity of DRBs from the RRC layer.

S705: The RRC layer sends the quantity of DRBs associated with the existing PDU session to the NAS. Accordingly, the NAS receives the quantity of DRBs associated with the existing PDU session sent by the RRC layer.

Optionally, the RRC layer may further send the correspondence between the QoS flow and the established DRB to the NAS. Accordingly, the NAS receives the correspondence between the QoS flow and the established DRB that is sent by the RRC layer, as shown by a dashed arrow in FIG. 7. For example, when the RRC layer determines that the quantity of DRBs associated with the existing PDU session reaches the second threshold, the RRC layer sends the correspondence between the QoS flow and the established DRB to the NAS.

S706: The NAS determines whether the quantity of DRBs associated with the existing PDU session reaches the second threshold. If the quantity of DRBs associated with the existing PDU session reaches the second threshold, S707 or S703 is performed; and if the quantity of DRBs associated with the existing PDU session does not reach the second threshold, S708 is performed.

S707: The NAS determines a to-be-released first QoS flow, and may trigger the session modification procedure to release the first QoS flow.

For a detailed implementation process of S707, refer to related descriptions of S607.

S708: The NAS triggers the session establishment procedure.

For a detailed implementation process of S708, refer to related descriptions of S608.

It should be noted that after performing the session release procedure, the UE may perform the session establishment procedure. For example, after performing S703, the UE may perform S708 to establish the new second PDU session. Similarly, after performing the session modification procedure, the UE may perform the session establishment procedure. For example, after performing S707, the UE performs S708 to establish the new second PDU session.

In this way, only when the UE needs to determine whether the quantity of DRBs associated with the existing PDU session reaches the second threshold, the non-access stratum interacts with the access stratum. That is, after the non-access stratum requests the RRC layer, the RRC layer transmits the quantity of DRBs associated with the existing PDU session in the UE to the NAS, so that the NAS can determine whether the quantity of DRBs associated with the existing PDU session in the UE reaches the second threshold. This avoids frequent interaction between the access stratum and the non-access stratum and occupying excessive communications resources, can also avoid a phenomenon that "when the quantity of existing PDU sessions in the UE does not reach the first threshold, but the quantity of DRBs associated with the existing PDU session in the UE reaches the second threshold, the session establishment request message initiated by the UE is rejected by the network device," and improves a PDU session establishment success rate.

Example 3: Refer to FIG. 3, FIG. 4, and FIG. 8A and FIG. 8B. The application processor in the UE determines whether the quantity of existing network connections (corresponding to the PDU sessions on the modem side) reaches an upper limit, and the NAS determines whether the quantity of DRBs reaches the upper limit, and receives, in a "passive receiving" manner in real time, a quantity of DRBs transmitted by the RRC layer. The specific implementation process is as follows.

S801: The RRC layer determines that a condition for actively sending the quantity of DRBs is met.

For a detailed implementation process of S801, refer to related descriptions of S601.

S802: The RRC layer sends the quantity of DRBs associated with the existing PDU session to the NAS. Accordingly, the NAS receives the quantity of DRBs associated with the existing PDU session sent by the RRC layer.

Optionally, the RRC layer may further send the correspondence between the QoS flow and the established DRB to the NAS. Accordingly, the NAS receives the correspondence between the QoS flow and the established DRB that is sent by the RRC layer, as shown by a dashed arrow in FIG. 8A and FIG. 8B. For example, when the RRC layer determines that the quantity of DRBs associated with the existing PDU session reaches the second threshold, the RRC layer sends the correspondence between the QoS flow and the established DRB to the NAS.

S803: The application processor determines that a new second network connection (that is, the second PDU session) needs to be established.

It should be noted that each PDU session is one network connection. On the modem side, "a connection for transmitting data between the UE and the data network" is usually described as a PDU session, and on the application processor side, "a connection for transmitting data between the UE and the data network" is usually described as a network connection.

S804: The application processor determines whether the quantity of existing network connections (that is, the existing PDU sessions) reaches the first threshold. If the quantity of existing network connections reaches the first threshold, S805 to S807 are performed; and if the quantity of existing network connections does not reach the first threshold, S808 and S809 are performed.

S805: The application processor determines a to-be-released first network connection (that is, the first PDU session).

The first network connection is one of the existing network connections in the UE. The first network connection corresponds to the first PDU session on the modem side. For the first network connection determined by the application processor, refer to related descriptions about "the first PDU session" in S502.

S806: The application processor sends a connection release request message to the non-access stratum.

Accordingly, the non-access stratum receives the connection release request message sent by the application processor.

The connection release request message is used to request the non-access stratum of the modem to release the first PDU session.

The non-access stratum may trigger the session release procedure to release the first PDU session.

S807: The non-access stratum sends a connection release response message to the application processor.

Accordingly, the application processor receives the connection release response message sent by the non-access stratum.

S808: The application processor sends a connection establishment request message to the non-access stratum.

Accordingly, the non-access stratum receives the connection establishment request message sent by the application processor.

The connection establishment request message is used to request the non-access stratum of the modem to establish the second PDU session. The non-access stratum performs S809.

S809: The non-access stratum determines whether the quantity of DRBs associated with the existing PDU session reaches the second threshold. If the quantity of DRBs associated with the existing PDU session reaches the second threshold, S810 or S811 is performed; and if the quantity of DRBs associated with the existing PDU session does not reach the second threshold, S812 is performed.

If the non-access stratum determines that the quantity of DRBs associated with the existing PDU session reaches the second threshold, the non-access stratum may determine a to-be-released first QoS flow, that is, S810 is performed, or the application processor may determine a to-be-released first network connection (that is, the first PDU session), that is, S811 is performed.

S810: The non-access stratum determines the to-be-released first QoS flow. The non-access stratum may trigger the session modification procedure to release the first QoS flow.

For a detailed implementation process of S810, refer to related descriptions of S607.

S811: The non-access stratum sends a connection establishment reject message to the application processor.

Accordingly, the application processor receives the connection establishment reject message sent by the non-access stratum. The application processor performs S805 to S807.

S812: The non-access stratum triggers the session establishment procedure.

It should be noted that, after receiving the connection release response message (that is, S807), the application processor may further send a connection establishment request message to the non-access stratum, to request the non-access stratum of the modem to trigger the session establishment procedure, so as to establish the new second PDU session. The application processor may further receive a connection establishment response message sent by the non-access stratum.

Compared with the current technology, the session management method in the embodiments of this application provides an interaction mechanism between the access stratum and the non-access stratum. In this way, the NAS may determine whether the quantity of DRBs associated with the existing PDU session in the UE reaches the second threshold. The session management method in the embodiments of this application further provides a mechanism for the application processor to determine the to-be-released first network connection (that is, the first PDU session). In this way, when the application processor determines that the quantity of existing network connections (that is, the existing PDU sessions in the UE) in the UE reaches the first threshold, the application processor can select and release a first network connection (that is, the first PUD session) that has minimal impact on a service, and an existing PDU session in the UE that is not released has a relatively high possibility of transmitting data. This improves communications resource utilization. In addition, the session establishment request message initiated by the UE is not rejected by the network device. This improves a PDU session establishment success rate, and reduces a service data transmission delay. Similarly, when the application processor determines that the quantity of existing network connections (that is, the existing PDU sessions in the UE) in the UE does not reach the first threshold, and the non-access stratum determines that the quantity of DRBs associated with the existing PDU session in the UE reaches the second threshold, the application processor may select and release the first network connection (that is, the first PUD session) that has the minimal impact on the service, or the non-access stratum may select and release a first QoS flow that has minimal impact on the service. This can avoid a phenomenon that "the session establishment request message initiated by the UE is rejected by the network device," and improve a PDU session establishment success rate.

Example 4: Refer to FIG. 3, FIG. 4, and FIG. 9A and FIG. 9B. The application processor in the UE determines whether the quantity of existing network connections (corresponding to the PDU sessions on the modem side) reaches an upper limit, and the NAS determines whether the quantity of DRBs reaches the upper limit, and obtains the quantity of DRBs from the RRC layer in an "active request" manner when requiring "the quantity of DRBs associated with the existing PDU session." The specific implementation process is as follows.

S901: The application processor determines that a new second network connection (that is, the second PDU session) needs to be established.

S902: The application processor determines whether the quantity of existing network connections (that is, the existing PDU sessions) reaches the first threshold. If the quantity of existing network connections reaches the first threshold, S903 to S905 are performed; and if the quantity of existing network connections does not reach the first threshold, S906 is performed.

S903: The application processor determines a to-be-released first network connection (that is, the first PDU session).

The first network connection is one of the existing network connections in the UE. The first network connection corresponds to the first PDU session on the modem side. For the first network connection determined by the application processor, refer to related descriptions about "the first PDU session" in S502.

S904: The application processor sends a connection release request message to the non-access stratum.

Accordingly, the non-access stratum receives the connection release request message sent by the application processor.

The connection release request message is used to request the non-access stratum of the modem to release the first PDU session.

The non-access stratum may trigger the session release procedure to release the first PDU session.

S905: The non-access stratum sends a connection release response message to the application processor.

Accordingly, the application processor receives the connection release response message sent by the non-access stratum.

S906: The application processor sends a connection establishment request message to the non-access stratum.

Accordingly, the non-access stratum receives the connection establishment request message sent by the application processor.

The connection establishment request message is used to request the non-access stratum of the modem to establish the second PDU session. The non-access stratum performs S907.

S907: The non-access stratum sends a first request message to the RRC layer.

Accordingly, the RRC layer receives the first request message sent by the non-access stratum, and performs S908.

The first request message is used by the NAS to request to obtain a current quantity of DRBs from the RRC layer.

S908: The RRC layer sends the quantity of DRBs associated with the existing PDU session to the NAS. Accordingly, the NAS receives the quantity of DRBs associated with the existing PDU session from the RRC layer, and performs S909.

Optionally, the RRC layer may further send the correspondence between the QoS flow and the established DRB to the NAS. Accordingly, the NAS receives the correspondence between the QoS flow and the established DRB that is sent by the RRC layer, as shown by a dashed arrow in FIG. 9A and FIG. 9B. For example, when the RRC layer determines that the quantity of DRBs associated with the existing PDU session reaches the second threshold, the RRC layer sends the correspondence between the QoS flow and the established DRB to the NAS.

S909: The NAS determines whether the quantity of DRBs associated with the existing PDU session reaches the second threshold. If the quantity of DRBs associated with the existing PDU session reaches the second threshold, S910 or S911 is performed; and if the quantity of DRBs associated with the existing PDU session does not reach the second threshold, S912 is performed.

If the NAS determines that the quantity of DRBs associated with the existing PDU session reaches the second threshold, the non-access stratum may determine the to-be-released first QoS flow, that is, S910 is performed, or the application processor may determine the to-be-released first network connection (that is, the first PDU session), that is, S911 is performed. Then, the application processor performs S903 to S905.

S910: The non-access stratum determines the to-be-released first QoS flow. The non-access stratum may trigger the session modification procedure to release the first QoS flow.

For a detailed implementation process of S910, refer to related descriptions of S607.

S911: The non-access stratum sends a connection establishment reject message to the application processor.

Accordingly, the application processor receives the connection establishment reject message sent by the non-access stratum. The application processor performs S903.

S912: The non-access stratum triggers the session establishment procedure.

In this way, only when the UE needs to determine whether the quantity of DRBs associated with the existing PDU session reaches the second threshold, the non-access stratum interacts with the access stratum. That is, after the non-access stratum requests the RRC layer, the RRC layer transmits the quantity of DRBs associated with the existing PDU session in the UE to the NAS, so that the NAS can determine whether the quantity of DRBs associated with the existing PDU session in the UE reaches the second threshold. This avoids frequent interaction between the access stratum and the non-access stratum and occupying excessive communications resources, can also avoid a phenomenon that "when the quantity of existing PDU sessions in the UE does not reach the first threshold, but the quantity of DRBs associated with the existing PDU session in the UE reaches the second threshold, the session establishment request message initiated by the UE is rejected by the network device," and improves a PDU session establishment success rate.

Figure 10:
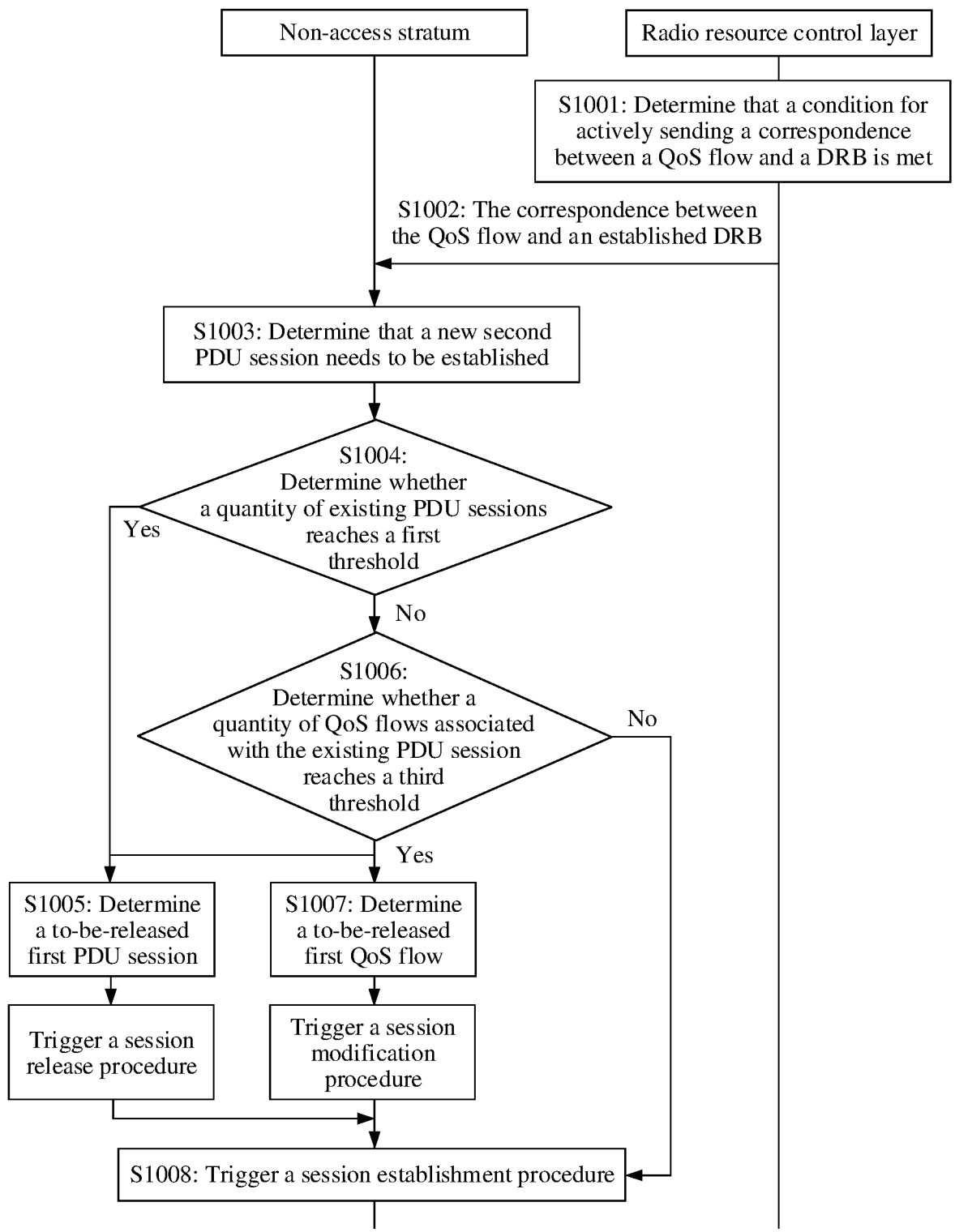
FIG. 10 is an example schematic flowchart of even yet another session management method according to an embodiment of this application.

Example 5: Refer to FIG. 3, FIG. 4, and FIG. 10. The NAS in the UE can determine whether the quantity of existing PDU sessions and the quantity of QoS flows reach an upper limit, and the NAS receives, in a "passive receiving" manner in real time, the correspondence between the QoS flow and the DRB that are transmitted by the RRC layer. The specific implementation process is as follows.

S1001: The RRC layer determines that a condition for actively sending the correspondence between the QoS flow and the DRB is met.

The condition for actively sending the correspondence between the QoS flow and the DRB includes any one of the following three items: 1. The quantity of DRBs associated with the existing PDU session changes. 2. The correspondence between the QoS flow and the established DRB changes. 3. The quantity of DRBs associated with the existing PDU session reaches the second threshold.

S1002: The RRC layer sends the correspondence between the QoS flow and the established DRB to the non-access stratum NAS.

Accordingly, the NAS receives the correspondence between the QoS flow and the established DRB that is sent by the RRC layer.

S1003: The non-access stratum NAS determines that the new second PDU session needs to be established.

S1004: The NAS determines whether the quantity of existing PDU sessions reaches the first threshold. If the quantity of existing PDU sessions reaches the first threshold, S1005 is performed; and if the quantity of existing PDU sessions does not reach the first threshold, S1006 is performed.

The first threshold is a value determined based on a maximum quantity of PDU sessions that can be established by the UE.

S1005: The NAS determines a to-be-released first PDU session. The NAS may trigger the session release procedure to release the first PDU session.

The first PDU session is one of the existing PDU sessions in the UE. For the first PDU session determined by the NAS, refer to related descriptions of "the first PDU session" in S502.

S1006: The NAS determines whether the quantity of QoS flows associated with the existing PDU session reaches the third threshold. If the quantity of QoS flows associated with the existing PDU session reaches the third threshold, S1007 or S1005 is performed; and if the quantity of QoS flows associated with the existing PDU session does not reach the third threshold, S1008 is performed.

The NAS can determine, based on the context information of the QoS flow, the quantity of QoS flows associated with the existing PDU session.

S1007: The NAS determines a to-be-released first QoS flow. The NAS may trigger the session modification procedure to release the first QoS flow.

The first QoS flow is one of the QoS flows associated with the existing PDU session in the UE. For the first QoS flow determined by the NAS, refer to related descriptions of "the first QoS flow" in S503.

S1008: The NAS triggers the session establishment procedure.

The network device and the UE may jointly complete the session establishment procedure. The UE sends the session establishment request message to the network device, to request to establish the second PDU session. For a detailed implementation process of the session establishment procedure, refer to the current technology.

It should be noted that after performing S1005, the UE may perform S1008. That is, after performing the session release procedure, the UE performs the session establishment procedure to establish the new second PDU session. Similarly, after performing S1007, the UE may perform S1008. That is, after performing the session modification procedure, the UE performs the session establishment procedure to establish the new second PDU session.

Compared with the current technology, the session management method in the embodiments of this application provides an interaction mechanism between the access stratum and the non-access stratum. In this way, the NAS may determine the to-be-released first QoS flow based on the correspondence between the QoS flow and the DRB. When the UE determines that the quantity of existing PDU sessions in the UE does not reach the first threshold, but the quantity of QoS flows associated with the existing PDU session in the UE reaches the third threshold, the UE can select and release a first PDU session that has minimal impact on a service, or the UE can select and release a first QoS flow that has minimal impact on the service. This can also avoid a phenomenon that "the session establishment request message initiated by the UE is rejected by the network device," and improve a PDU session establishment success rate.

It may be understood that, to implement the foregoing functions, the user equipment includes corresponding hardware structures and/or software modules for performing the functions. With reference to the units and algorithm steps of the examples described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, division into functional units may be performed on a session management apparatus based on the foregoing example of the method. For example, functional units may be divided based on corresponding functions, or two or more than two functions may be integrated into one processing unit. The integrated unit may be implemented in a form of hardware, or may be implemented in a form of a software function unit. It should be noted that, in the embodiments of this application, unit division is an example, and is merely logical function division. In an actual implementation, another division manner may be used.

Figure 11:
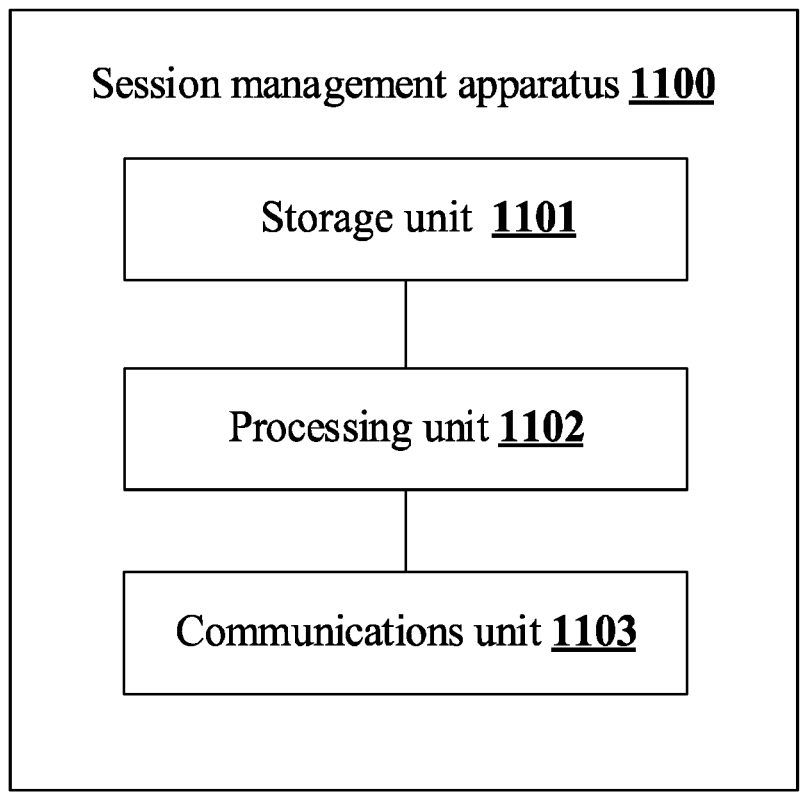
FIG. 11 is an example schematic diagram of a structure of a session management apparatus according to an embodiment of this application.

FIG. 11 is a schematic block diagram of a session management apparatus according to an embodiment of this application. The session management apparatus 1100 may exist in a form of software, or may be a device, or a component (for example, a chip system) in a device. The session management apparatus 1100 includes a processing unit 1102 and a communications unit 1103.

The communications unit 1103 may be further divided into a sending unit (not shown in FIG. 11) and a receiving unit (not shown in FIG. 11). The sending unit is configured to support the session management apparatus 1100 in sending information to another network element. The receiving unit is configured to support the session management apparatus 1100 in receiving information from another network element.

When the session management apparatus 1100 is configured to implement a function of the foregoing user equipment, for example, the processing unit 1102 may be configured to support the session management apparatus 1100 in performing S501, S502, S503, and S504 in FIG. 5, and/or is used in another process in the solution described herein. The processing unit 1102 may include a first processing unit (not shown in FIG. 11) and a second processing unit (not shown in FIG. 11). The first processing unit may be specifically the application processor in FIG. 2, and the second processing unit may be specifically the modem in FIG. 2. The second processing unit includes a first module and a second module. The first module belongs to an access stratum, such as the RRC layer in FIG. 4, and the second module belongs to a non-access stratum, such as the NAS in FIG. 4. The first processing unit is configured to determine that a quantity of existing PDU sessions in the session management apparatus reaches a first threshold, or the second module is configured to: determine that a quantity of existing PDU sessions in the session management apparatus reaches a first threshold, determine that a quantity of DRBs associated with the existing PDU session in the session management apparatus reaches a second threshold, and determine that a quantity of QoS flows associated with the existing PDU session in the session management apparatus reaches a third threshold. The communications unit 1103 is configured to support communication between the session management apparatus 1100 and another network element (for example, a network device). For example, the communications unit 1103 is configured to support the session management apparatus 1100 in sending the session establishment request message, the session modification request message, or the session release request message to the network device shown in FIG. 5, and/or is used in another process of the solution described in this specification.

Optionally, the session management apparatus 1100 may further include a storage unit 1101, configured to store program code and data of the session management apparatus 1100. The data may include but is not limited to original data, intermediate data, or the like.

The processing unit 1102 may be a processor or a controller, for example, may be a CPU, a general purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The communications unit 1103 may be a communications interface, a transceiver, a transceiver circuit, or the like. The communications interface is a general name. In a specific implementation, the communications interface may include a plurality of interfaces, for example, an interface between UE and UE and/or another interface.

The storage unit 1101 may be a memory.

When the processing unit 1102 is a processor, the communications unit 1103 is a transceiver, and the storage unit 1101 is a memory. The session management apparatus 1100 in the embodiments of this application may be shown in FIG. 2.

A person of ordinary skill in the art may understand that all or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in an electrical form or another form.

The units described as separate parts may or may not be physically separate, and parts displayed as units may or may not be physical units, may be located at one position, or may be distributed on a plurality of network devices (for example, UE). Some or all of the units may be selected based on actual requirements to achieve the objectives of the solutions of the embodiments.

In addition, functional units in the embodiments of this application may be integrated into one processing unit, or each of the functional units may exist independently, or two or more units are integrated into one unit. The integrated unit may be implemented in a form of hardware, or may be implemented in a form of hardware combined with a software function unit.

Based on the foregoing descriptions of the implementations, a person skilled in the art may clearly understand that this application may be implemented by software in addition to necessary universal hardware or by hardware only. In most circumstances, the former is a preferred implementation. Based on such an understanding, the technical solutions of this application essentially or the part contributing to the current technology may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A session management method, comprising:
when user equipment (UE) determines that a specified condition is met, sending, by the UE, a session release request message or a session modification request message to a network device, wherein
the session release request message is used to request release of a first protocol data unit (PDU) session;
the session modification request message is used to request release of a first quality of service (QoS) flow;
the first PDU session is one of an existing PDU sessions in the UE; and
the specified condition includes at least one of:
a quantity of existing PDU sessions in the UE reaching a first threshold;
a quantity of data radio bearers (DRB)s associated with the existing PDU sessions in the UE reaching a second threshold; and
a quantity of QoS flows associated with the existing PDU sessions in the UE reaching a third threshold; and
the first PDU session meets at least one of the following criteria:
the first PDU session is a local area data network (LADN) session, and the UE is located outside a service area of the LADN session;
a user plane connection of the first PDU session is in an unestablished state;
a duration in which the user plane connection of the first PDU session is in the unestablished state is greater than a duration in which a user plane connection of a third PDU session is in the unestablished state;
a quantity of QoS rules associated with the first PDU session is less than a quantity of QoS rules associated with the third PDU session;
a quantity of applications associated with the first PDU session is less than a quantity of applications associated with the third PDU session; and
the first PDU session is not associated with a specified application, wherein
the third PDU session is any PDU session that is in the existing PDU sessions in the UE and that is different from the first PDU session.

2. The session management method according to claim 1, wherein the specified condition further includes:
a second PDU session needing to be established.

3. The session management method according to claim 1, wherein
the UE includes a first module and a second module,
the first module belongs to an access stratum, and
the second module belongs to a non-access stratum; and
the quantity of DRBs is obtained by the second module from the first module.

4. The session management method according to claim 1, wherein the first QoS flow meets at least one of the following criteria:
a DRB to which the first QoS flow is mapped has a correspondence with only the first QoS flow;
a quantity of QoS rules associated with the first QoS flow is less than a quantity of QoS rules associated with a second QoS flow;
a quantity of applications associated with the first QoS flow is less than a quantity of applications associated with the second QoS flow; and
the first QoS flow is not associated with a specified application, wherein
the second QoS flow is any QoS flow that is in the existing PDU sessions in the UE and that is different from the first QoS flow.

5. The session management method according to claim 4, wherein
the DRB to which the first QoS flow is mapped is determined by a second module of the UE based on a correspondence between the DRB and the first QoS flow, and
the correspondence between the DRB and the first QoS flow is obtained by the second module from a first module of the UE.

6. The session management method according to claim 1, wherein after sending, by the UE, the session release request message or the session modification request message to the network device, the method further comprises:
sending, by the UE, a session establishment request message to the network device, wherein the session establishment request message is used to request to establish a second PDU session.

7. The session management method according to claim 1, wherein
the UE includes an application processor (AP) and a modem,
the modem includes a first module and a second module,
the first module belongs to an access stratum, and the second module belongs to a non-access stratum; and
determining, by the UE, that the specified condition is met includes:
determining, by the AP, that a quantity of existing network connections in the UE reaches the first threshold;
determining, by the second module, that the quantity of existing PDU sessions in the UE reaches the first threshold;
determining, by the second module, that the quantity of DRBs associated with the existing PDU sessions in the UE reaches the second threshold; or
determining, by the second module, that the quantity of QoS flows associated with the existing PDU sessions in the UE reaches the third threshold, wherein
each network connection corresponds to one PDU session.

8. The session management method according to claim 1, wherein
the first threshold includes a value determined based on a maximum quantity of PDU sessions that can be established by the UE,
the second threshold includes a value determined based on a maximum quantity of DRBs that can be established by the UE, and
the third threshold includes a value determined based on a maximum quantity of QoS flows that can be transmitted by the UE.

9. A session management apparatus, comprising:
a processor; and
a memory configured to store computer readable instructions that, when executed by the processor, cause the session management apparatus to:
when user equipment (UE) determines that a specified condition is met, send, by the UE, a session release request message or a session modification request message to a network device, wherein
the session release request message is used to request release of a first protocol data unit (PDU) session;
the session modification request message is used to request release of a first quality of service (QoS) flow;
the first PDU session is one of an existing PDU session in the UE;
the specified condition includes at least one of:
a quantity of existing PDU sessions in the UE reaching a first threshold;
a quantity of data radio bearers (DRB)s associated with the existing PDU sessions in the UE reaching a second threshold; and
a quantity of QoS flows associated with the existing PDU sessions in the UE reaching a third threshold; and
the first PDU session meets at least one of the following criteria:
the first PDU session is a local area data network (LADN) session, and the UE is located outside a service area of the LADN session;
a user plane connection of the first PDU session is in an unestablished state;
a duration in which the user plane connection of the first PDU session is in the unestablished state is greater than a duration in which a user plane connection of a third PDU session is in the unestablished state;
a quantity of QoS rules associated with the first PDU session is less than a quantity of QoS rules associated with the third PDU session;
a quantity of applications associated with the first PDU session is less than a quantity of applications associated with the third PDU session; and
the first PDU session is not associated with a specified application, wherein
the third PDU session is any PDU session that is in the existing PDU sessions in the UE and that is different from the first PDU session.

10. The session management apparatus according to claim 9, further comprising:
a first module; and
a second module, wherein
the first module belongs to an access stratum, and the second module belongs to a non-access stratum; and
the quantity of DRBs is obtained by the second module from the first module.

11. The session management apparatus according to claim 9, wherein
the first QoS flow meets at least one of the following criteria:
a DRB to which the first QoS flow is mapped has a correspondence with only the first QoS flow;
a quantity of QoS rules associated with the first QoS flow is less than a quantity of QoS rules associated with a second QoS flow;
a quantity of applications associated with the first QoS flow is less than a quantity of applications associated with the second QoS flow; and
the first QoS flow is not associated with a specified application, wherein
the second QoS flow is any QoS flow that is in the existing PDU sessions in the UE and that is different from the first QoS flow,
the DRB to which the first QoS flow is mapped is determined by a second module of the session management apparatus based on a correspondence between the DRB and the first QoS flow, and
the correspondence between the DRB and the first QoS flow is obtained by the second module from a first module of the session management apparatus.

12. The session management apparatus according to claim 9, wherein the session management apparatus is further caused to:
after sending the session release request message or the session modification request message to the network device, send, by the UE, a session establishment request message to the network device, wherein the session establishment request message is used to request to establish a second PDU session.

13. The session management apparatus according to claim 9, wherein
the UE includes an application processor (AP) and a modem,
the modem includes a first module and a second module, the first module belongs to an access stratum, and the second module belongs to a non-access stratum; and
the processor is further caused to:
determine, by the AP, that a quantity of existing network connections in the UE reaches the first threshold;
determine, by the second module, that the quantity of existing PDU sessions in the UE reaches the first threshold;
determine, by the second module, that the quantity of DRBs associated with the existing PDU sessions in the UE reaches the second threshold; or
determine, by the second module, that the quantity of QoS flows associated with the existing PDU sessions in the UE reaches the third threshold, wherein
each network connection corresponds to one PDU session.

14. A non-transitory computer readable storage medium having computer readable instructions that, when executed by a processor of an information processing apparatus, cause the information processing apparatus to provide execution comprising:
when user equipment (UE) determines that a specified condition is met, sending, by the UE, a session release request message or a session modification request message to a network device, wherein
the session release request message is used to request release of a first protocol data unit (PDU) session;
the session modification request message is used to request release of a first quality of service (QoS) flow;
the first PDU session is one of an existing PDU session in the UE;
the specified condition includes at least one of:
a quantity of existing PDU sessions in the UE reaching a first threshold;
a quantity of data radio bearers (DRB)s associated with the existing PDU sessions in the UE reaching a second threshold; and
a quantity of QoS flows associated with the existing PDU sessions in the UE reaching a third threshold; and the first PDU session meets at least one of the following criteria:
the first PDU session is a local area data network (LADN) session, and the UE is located outside a service area of the LADN session;
a user plane connection of the first PDU session is in an unestablished state;
a duration in which the user plane connection of the first PDU session is in the unestablished state is greater than a duration in which a user plane connection of a third PDU session is in the unestablished state;
a quantity of QoS rules associated with the first PDU session is less than a quantity of QoS rules associated with the third PDU session;
a quantity of applications associated with the first PDU session is less than a quantity of applications associated with the third PDU session; and
the first PDU session is not associated with a specified application, wherein
the third PDU session is any PDU session that is in the existing PDU sessions in the UE and that is different from the first PDU session.

15. The non-transitory computer readable storage medium according to claim 14, wherein the specified condition further includes:
a second PDU session needing to be established.

16. The non-transitory computer readable storage medium according to claim 14, wherein
the information processing apparatus includes a first module and a second module, the first module belongs to an access stratum, and the second module belongs to a non-access stratum; and
the quantity of DRBs is obtained by the second module from the first module.

17. The non-transitory computer readable storage medium according to claim 14, wherein
the UE includes an application processor (AP) and a modem,
the modem includes a first module and a second module, the first module belongs to an access stratum, and the second module belongs to a non-access stratum; and
determining, by the UE, that the specified condition is met includes:
determining, by the AP, that a quantity of existing network connections in the UE reaches the first threshold;
determining, by the second module, that the quantity of existing PDU sessions in the UE reaches the first threshold;
determining, by the second module, that the quantity of DRBs associated with the existing PDU sessions in the UE reaches the second threshold; or
determining, by the second module, that the quantity of QoS flows associated with the existing PDU sessions in the UE reaches the third threshold, wherein
each network connection corresponds to one PDU session.

* * * * *